United States Patent
Yoshida

(10) Patent No.: US 6,217,133 B1
(45) Date of Patent: Apr. 17, 2001

(54) BRAKE FORCE CONTROL APPARATUS

(75) Inventor: Hiroaki Yoshida, Mishima (JP)

(73) Assignee: Toyota Jidosha Kabushiki Kaisha, Toyota (JP)

(*) Notice: Subject to any disclaimer, the term of this patent is extended or adjusted under 35 U.S.C. 154(b) by 0 days.

(21) Appl. No.: 09/319,679

(22) PCT Filed: Feb. 26, 1998

(86) PCT No.: PCT/JP98/00795

§ 371 Date: Jun. 9, 1999

§ 102(e) Date: Jun. 9, 1999

(87) PCT Pub. No.: WO98/51553

PCT Pub. Date: Nov. 19, 1998

(30) Foreign Application Priority Data

May 9, 1997 (JP) .................................................. 9-119883

(51) Int. Cl.$^7$ ................................ B60T 7/12; B60T 8/00; B60T 13/66

(52) U.S. Cl. ............................... 303/113.4; 188/DIG. 1; 188/358; 303/15; 303/155; 303/116.1; 303/113.1; 303/114.1

(58) Field of Search ................................ 303/155, 113.4, 303/114.3, 116.1–119.1, 3, 15, 20, 10–12, 13–14, 122.11, 113.1, 114.1, 166, DIG. 3, DIG. 4, 167; 188/DIG. 1, 355–359; 701/70, 71, 80

(56) References Cited

U.S. PATENT DOCUMENTS

| 4,774,667 | 9/1988 | Kuraoka et al. . |
| 5,158,343 | 10/1992 | Reichelt et al. . |
| 5,261,730 | 11/1993 | Steiner et al. . |

(List continued on next page.)

FOREIGN PATENT DOCUMENTS

| 4427246 | 2/1996 | (DE) . |
| 0711695 | 5/1996 | (EP) . |
| 2282649 | 4/1995 | (GB) . |
| 2295209 | 5/1996 | (GB) . |
| 61-268560 | 11/1986 | (JP) . |
| 3-227766 | 10/1991 | (JP) . |
| 4-121260 | 4/1992 | (JP) . |
| 4-334649 | 11/1992 | (JP) . |
| 5-50908 | 3/1993 | (JP) . |
| 5-97022 | 4/1993 | (JP) . |
| 5-262212 | 10/1993 | (JP) . |
| 7-76267 | 3/1995 | (JP) . |
| 7-81540 | 3/1995 | (JP) . |
| 7-156786 | 6/1995 | (JP) . |
| 7-315187 | 12/1995 | (JP) . |
| 7-329764 | 12/1995 | (JP) . |
| 7-329766 | 12/1995 | (JP) . |
| 8-34326 | 2/1996 | (JP) . |
| 8-40229 | 2/1996 | (JP) . |
| 8-506301 | 7/1996 | (JP) . |
| 8-507021 | 7/1996 | (JP) . |
| 8-230634 | 9/1996 | (JP) . |
| 8-295224 | 11/1996 | (JP) . |
| 8-301098 | 11/1996 | (JP) . |
| WO96/06763 | 3/1996 | (WO) . |
| 9739926 | * 10/1997 | (WO) . |

*Primary Examiner*—Douglas C. Butler
(74) *Attorney, Agent, or Firm*—Kenyon & Kenyon

(57) ABSTRACT

A brake force control apparatus which can quickly supply pressurized brake fluid to wheel cylinders immediately after a condition for starting a brake assist control is established. The brake force control apparatus has emergency brake determining structure for determining an emergency brake operation performed by a driver, a high pressure source for generating a fluid pressure which is higher than a fluid pressure generated by a master cylinder, and a supply for supplying brake fluid from the pump to a wheel cylinder based on the determination made by the emergency brake determining structure. Actuating structure is provided for actuating the high pressure source before the fluid pressure is supplied by the supply.

7 Claims, 9 Drawing Sheets

U.S. PATENT DOCUMENTS

| | | |
|---|---|---|
| 5,350,225 | 9/1994 | Steiner et al. . |
| 5,367,942 | 11/1994 | Nell et al. . |
| 5,427,442 | 6/1995 | Heibel . |
| 5,445,444 | 8/1995 | Rump et al. . |
| 5,492,397 | 2/1996 | Steiner et al. . |
| 5,496,099 | 3/1996 | Resch . |
| 5,499,866 | 3/1996 | Brugger et al. . |
| 5,513,906 | 5/1996 | Steiner . |
| 5,535,123 | 7/1996 | Rump et al. . |
| 5,539,641 | 7/1996 | Littlejohn . |
| 5,549,369 | 8/1996 | Rump et al. . |
| 5,556,173 | 9/1996 | Steiner et al. . |
| 5,564,797 | 10/1996 | Steiner et al. . |
| 5,567,021 | 10/1996 | Gaillard . |
| 5,584,542 | 12/1996 | Klarer et al. . |
| 5,586,814 | 12/1996 | Steiner . |
| 5,588,718 * | 12/1996 | Winner et al. . |
| 5,607,209 | 3/1997 | Narita et al. . |
| 5,658,055 | 8/1997 | Dieringer et al. . |
| 5,660,448 | 8/1997 | Kiesewetter et al. . |
| 5,669,676 | 9/1997 | Rump et al. . |
| 5,719,769 | 2/1998 | Brugger et al. . |
| 5,720,532 | 2/1998 | Steiner et al. . |
| 5,762,407 | 6/1998 | Stacey et al. . |
| 5,772,290 | 6/1998 | Heibel et al. . |
| 5,779,329 | 7/1998 | Takeshima . |
| 5,890,776 | 4/1999 | Sawada . |
| 5,931,545 | 8/1999 | Yonemura et al. . |
| 5,961,188 | 10/1999 | Sawada . |
| 5,978,725 | 11/1999 | Kagawa . |

* cited by examiner

FIG. 2 ASSIST PRESSURE INCREASING STATE (BA OPERATION STATE) FR FRONT/REAR PIPING VEHICLE

ASSIST PRESSURE HOLDING STATE (BA CONTROL)
FR FRONT/REAR PIPING VEHICLE

ASSIST PRESSURE DECREASING STATE
(BA CONTROL OR BA+ABS CONTROL)

ASSIST PRESSURE HOLDING STATE (BA+ABS CONTROL)

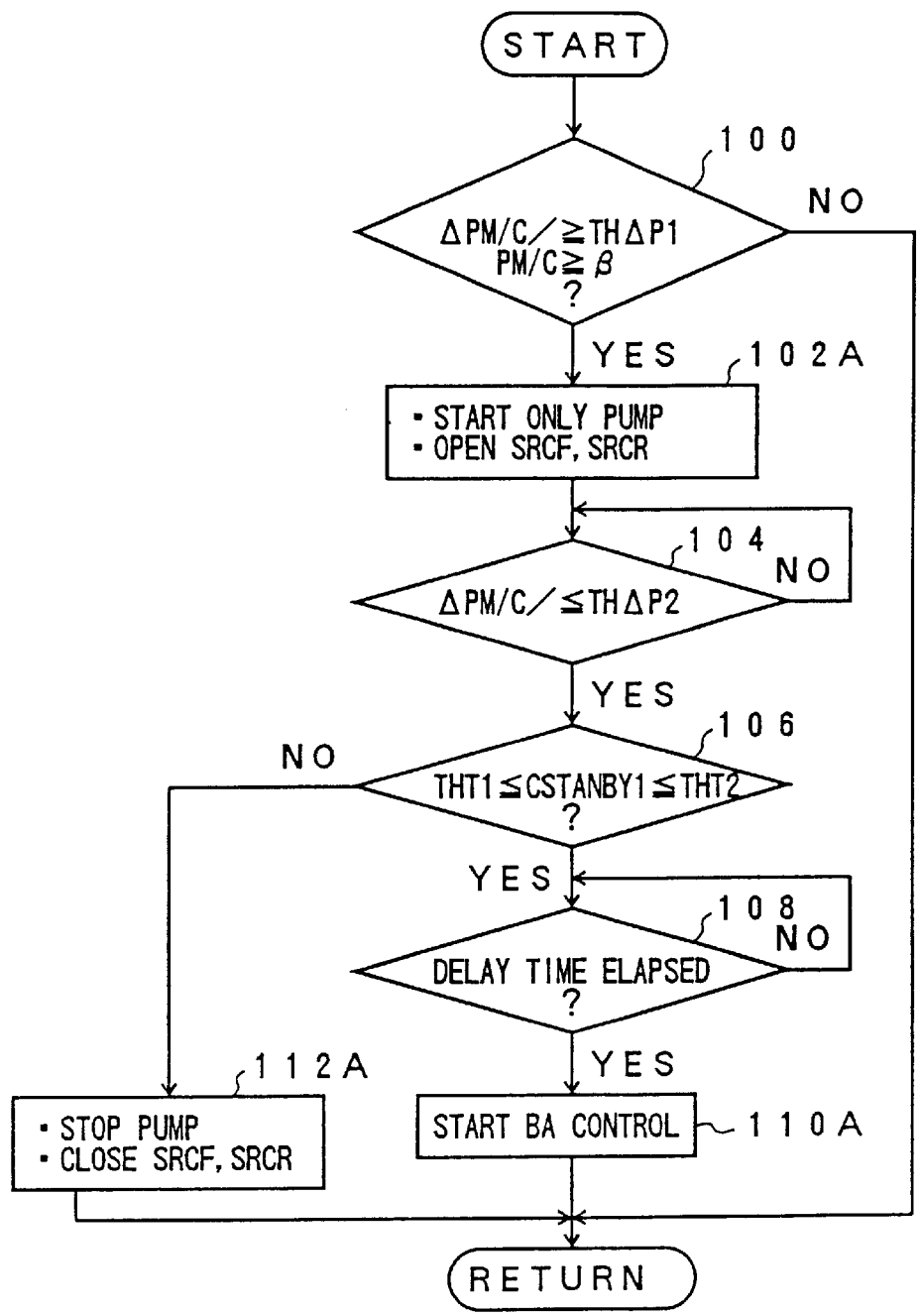

ed during a normal brake operation. Thus, when the driver
requests a rapid increase in a brake force, it is possible to
correctly satisfy the request.

BRAKE FORCE CONTROL APPARATUS

TECHNICAL FIELD

The present invention relates to a brake force control apparatus and, more particularly, to a brake force control apparatus which generates, when an emergency brake operation is performed in a vehicle, a relatively large brake force as compared to that generated during a normal brake operation.

BACKGROUND ART

Conventionally, as disclosed in Japanese Laid-Open Patent Application No. 4-121260, a brake force control apparatus is known which increases a power ratio of a brake booster when a brake pedal is depressed at a speed exceeding a predetermined speed. A driver of a vehicle operates a brake pedal at a high speed when a rapid increase in a brake force is desired. Hereinafter, such a brake operation is referred to as an emergency brake operation.

The above-mentioned conventional brake force control apparatus determines that the emergency brake operation is being performed when the brake pedal is operated at a speed which is greater than a predetermined speed. In this case, a relatively high brake pressure as compared to that generated during a normal brake operation is generated by pressurizing brake fluid stored in a reservoir and supplying the pressurized brake fluid to wheel cylinders. Hereinafter, this brake control is referred to as a brake assist control (abbreviated as a BA control).

According to the above-mentioned conventional brake force control apparatus, when the emergency brake operation is performed, an advantageous situation can be established for a rapid increase in the brake force by generating a relatively large power ratio as compared to that generated during a normal brake operation. Thus, when the driver requests a rapid increase in a brake force, it is possible to correctly satisfy the request.

In order to generate a relatively high brake pressure as compared to that generated during the normal brake operation when the emergency brake operation is performed by the driver, it is necessary to provide the brake force control apparatus with a means for pressurizing the brake fluid. A pump can be used as such a means. However, when a pump is used as a high pressure source, the increase in the brake force may be delayed due to a delay in the response of the pump, if the pump is started to be operated after a condition for starting the BA control is established. In this case, it is impossible to generate a brake force which appropriately satisfies the request by the driver.

DISCLOSURE OF THE INVENTION

It is an object of the present invention to provide a brake force control apparatus which can quickly supply pressurized brake fluid to wheel cylinders immediately after a condition for starting the BA control is established by starting the operation of a high pressure source before the BA control is started.

The above-mentioned objects can be achieved by a brake force control apparatus comprising:

emergency brake determining means for determining an emergency brake operation performed by a driver;

a high pressure source for generating a fluid pressure which is higher than a fluid pressure generated by a master cylinder; and supply means for supplying brake fluid from the pump to a wheel cylinder based on the determination made by the emergency brake determining means, characterized by further comprising:

actuating means for actuating the high pressure source before the fluid pressure is supplied by the supply means.

In this invention, since the brake fluid can be immediately supplied to the wheel cylinder from the high pressure source, the brake force control for the emergency brake operation can be provided so as to be highly responsive. Generally, the high pressure source cannot immediately increase the fluid pressure to a desired high pressure after being started due to inertia. Thus, if the operation of the pump is started at a time when the brake force control for the emergency brake operation is started, a delay is generated until the brake fluid is actually supplied to the wheel cylinder, and as a result, the response of the brake force control may be deteriorated.

However, according to the present invention, the high pressure source starts to pressurize the brake fluid before the supply means supplies the fluid pressure. Thus, at a time when the pressurized brake fluid is supplied to the wheel cylinder, the high pressure source has been already started and the pressure of the brake fluid is increased to a predetermined value. Accordingly, it is possible to immediately supply the pressurized brake fluid to the wheel cylinder.

Additionally, the emergency brake determining means may comprise:

necessary condition determining means for determining an establishment of a necessary condition for the emergency brake operation; and sufficient condition determining means for determining an establishment of a sufficient condition for the emergency brake operation, wherein the actuating means actuates the high pressure source when the necessary condition is established.

The necessary condition may be established when a brake operating speed is greater than or equal to a first predetermined speed.

Additionally, the sufficient condition may be established when a high-speed operating time after the brake operating speed becomes greater than or equal to the first predetermined speed until the brake operating speed becomes smaller than or equal to a second predetermined speed is greater than or equal to a first predetermined time.

In this invention, the brake fluid is supplied from the high pressure source to the wheel cylinder only when an elapsed time after the brake operating speed becomes greater than or equal to the first predetermined speed until the brake operating speed becomes smaller than or equal to the second predetermined speed, that is, a time for which the brake operation is maintained to be performed at a high speed is greater than the first predetermined time. When a driver of a vehicle requests a rapid increase in the brake force, the high-speed operating time is relatively long. In such a case, the supply means positively supplies the brake fluid from the high pressure source to the wheel cylinder. On the other hand, when the emergency brake operation is instantaneously performed due to a vibration of the vehicle, the high-speed operating time is relatively short. In such a case, the supply means does not unnecessarily supplies the brake fluid from the high pressure source to the wheel cylinder. Accordingly, it is possible to generate the increased fluid pressure only when the driver requests a rapid increase in the brake force without being subjected to the influence of the instantaneous brake operation due to a vibration of the vehicle.

Additionally, the high-speed operating time may be started to be counted when the brake operating speed exceeds the first predetermined speed and the amount of brake operation exceeds a first amount of operation.

In this invention, the high-speed operating time is started to be counted after a brake operation with a high operating speed and the amount of brake operation is large. Both of the above-mentioned two conditions for starting to count the high-speed operating time are established when the driver requests a rapid increase in the brake force. Thus, the driver's request can be accurately detected by providing these two conditions. Accordingly, it is possible to accurately detect a situation in which the driver requests a rapid increase in the brake force.

Additionally, the supply means may supply the brake fluid from the high pressure source to the wheel cylinder when the high-speed operating time is greater than or equal to the first predetermined time and smaller than or equal to a second predetermined time.

In this invention, the brake fluid is supplied from the high pressure source to the wheel cylinder when the high-speed operating time is greater than or equal to the first predetermined time and smaller than or equal to a second predetermined time. When a brake operation is properly performed by the driver, a high operating speed is not maintained for an excessively long time. On the other hand, when a high-speed brake operation is erroneously detected, a decrease in the operating speed may not be detected for an excessively long time after the high-speed operation is detected. According to the invention, the brake fluid pressure is not unnecessarily increased in such a situation. Accordingly, it is possible to accurately detect a situation in which the driver requests a rapid increase in the brake force.

Additionally, the second predetermined speed may be smaller than the first predetermined speed.

In this invention, the brake operating speed increases immediately after the start of the brake operation, and then decreases after an appropriate amount of brake operation is achieved. Thus, by setting the second predetermined speed to a value smaller than the first predetermined speed, the driver's intention can be accurately reflected to the high-speed operating time. Accordingly, it is possible to accurately detect a situation in which the driver requests a rapid increase in the brake force.

Additionally, the emergency brake determining means may comprise:

necessary condition determining means for determining an establishment of a necessary condition for the emergency brake operation;

first sufficient condition determining means for determining an establishment of a sufficient condition for the emergency brake operation; and second sufficient condition determining means for determining a necessity for the brake fluid to be supplied by the supply means based on the determination made by the first sufficient condition determining means, and the actuating means may actuate the high pressure source when the first sufficient condition is established.

The second sufficient condition determining means may determine that fluid pressure is required to be supplied by the supply means when a predetermined time has elapsed after the first sufficient means has determined an establishment of the sufficient condition.

Additionally, the second sufficient condition determining means may determine the necessity for the fluid pressure to be supplied based on a difference between a master cylinder pressure and a wheel cylinder pressure.

In this invention, the brake fluid is supplied from the high pressure source to the wheel cylinder when the necessary condition determining means determines that the necessary condition for the emergency brake condition is established, the first sufficient condition determining means determines that the sufficient condition is established, and the second sufficient condition determining means determines that the fluid pressure is required to be supplied by the supply means. Accordingly, it is possible to improve the accuracy of the brake control since the increased brake force can be generated when the driver really intends to perform the emergency brake operation.

BRIEF DESCRIPTION OF THE DRAWINGS

FIG. 5-(B) is a graph showing changes generated in the master cylinder pressure $P_{M/C}$ and a wheel cylinder pressure $P_{W/C}$ when an emergency brake operation is performed in the brake force control apparatus according to the embodiment of the present invention.

FIG. 9 is a flowchart of another example of a pump control routine performed to achieve the BA control in the brake force control apparatus according to the embodiment of the present invention.

BEST MODE FOR CARRYING OUT THE INVENTION

Figure 1:
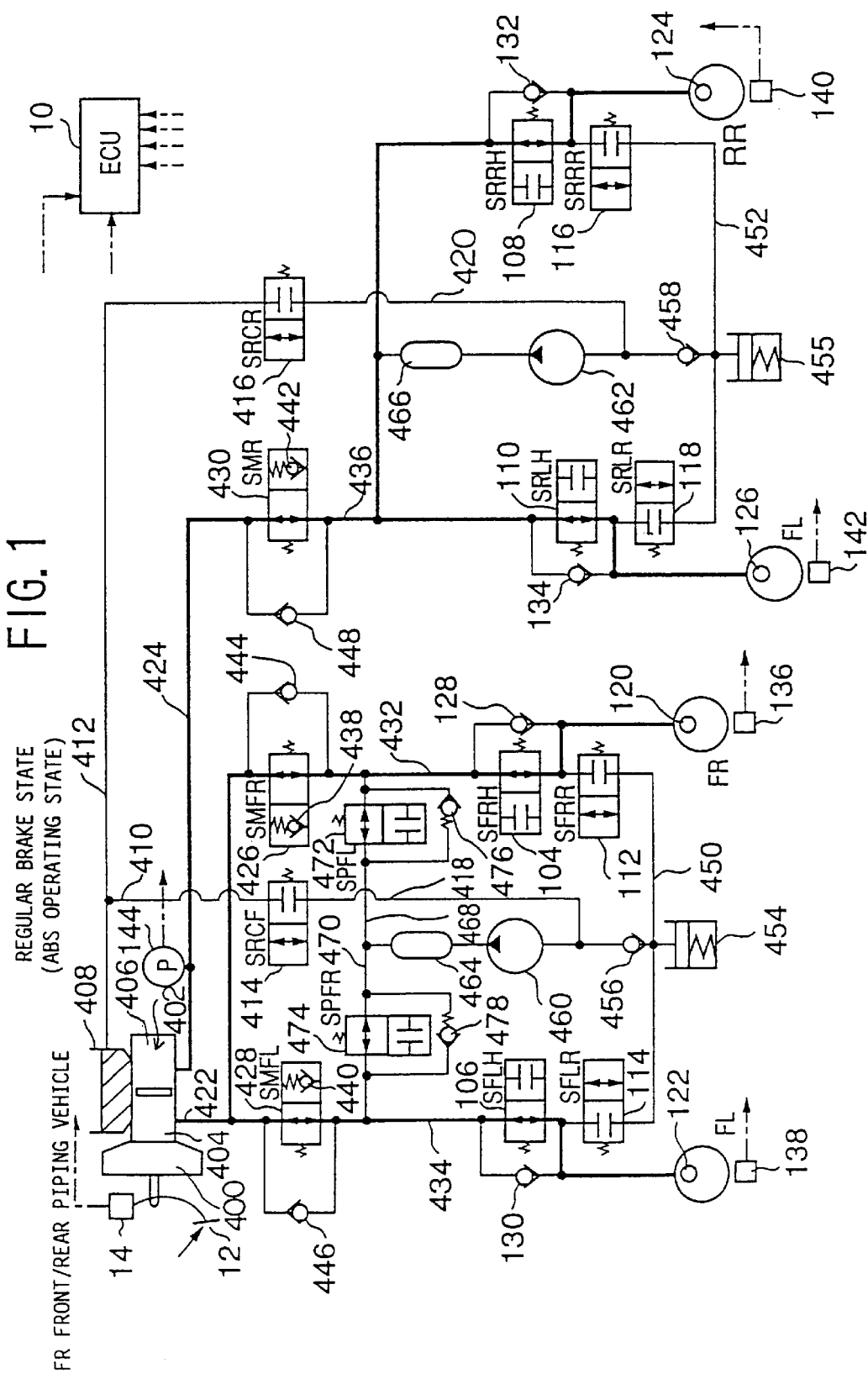
FIG. 1 is a system structure diagram showing a regular brake state and an ABS operating state of the brake force control apparat according to an embodiment of the present invention.

FIG. 1 shows a system structure diagram of a pump-up type brake force control apparatus (hereinafter simply referred to as a brake force control apparatus) according to an embodiment of the present invention. The brake force control apparatus according to the present embodiment is suitable for a brake force control apparatus used for a front-engine rear-drive automobile (FR automobile). The brake force control apparatus according to the present embodiment is controlled by an electronic control unit 10 (hereinafter referred to as ECU 10).

The brake force control apparatus comprises a brake pedal 12. A brake switch 14 is provided near the brake pedal 12. The ECU 10 determined whether or not the brake pedal is depressed based on an output signal of the brake switch 14.

The brake pedal 12 is connected to a vacuum booster 400. The vacuum booster 400 generates an assist force Fa, which has a predetermined power ratio with respect to a brake pressing force F, when the brake pedal is depressed. A master cylinder 402 is fixed to the vacuum booster 400.

The master cylinder 402 is of a center valve conventional type, and includes a first hydraulic pressure chamber 404 and a second hydraulic pressure chamber 406. The first hydraulic pressure chamber 404 and the second hydraulic pressure chamber 406 generate a master cylinder pressure $P_{M/C}$ corresponding to a combined force of the brake pressing force F and the assist force Fa.

A reservoir tank 408 is provided above the master cylinder 402. The reservoir tank 408 is connected to a front reservoir passage 410 and a rear reservoir passage 412. The front reservoir passage 410 is connected to a front reservoir cut solenoid valve 414 (hereinafter referred to as SRCF 414). Similarly, the rear reservoir passage 412 is connected to a rear reservoir cut solenoid valve 416 (hereinafter referred to as SRCR 416).

A front pump passage 418 is connected to SRCF 414. Similarly, a rear pump passage 420 is connected to SRCR 416. SRCF 414 is a two-position solenoid valve which disconnects the front reservoir passage 410 and the front pump passage 418 from each other by being turned off and connects them to each other by being turned on. SRCR 416 is a two-position solenoid valve which disconnects the rear reservoir passage 412 and the rear pump passage 420 from each other by being turned off and connects them to each other by being turned on.

A first fluid pressure passage 422 and a second fluid pressure passage 424 are connected to the first hydraulic pressure chamber 404 and the second hydraulic pressure chamber 406 of the master cylinder 402, respectively. The first fluid pressure passage 422 is connected to a right front master cut solenoid valve 426 (hereinafter referred to as SMFR 426) and a left master cut solenoid valve 428 (hereinafter referred to as SMFL 428). The second fluid pressure passage 424 is connected to a rear master cut solenoid valve 430 (hereinafter referred to as SMR 430).

SMFR 426 is connected to a fluid pressure passage 432 provided to a front right wheel FR. Similarly, SMFL 428 is connected to a fluid pressure passage 434 provided to a front left wheel FR. Additionally, SMR 430 is connected to a fluid pressure passage 436 provided to the rear left and rear right wheels RL and RR.

Constant pressure relief valves 438, 440 and 442 are provided inside SMFR 426, SMFL 428 and SMR 430, respectively. SMFR 426 is a two-position solenoid valve which connects the first fluid pressure passage 422 and the fluid pressure passage 432 to each other by being turned off and connects the first fluid pressure passage 422 and the fluid pressure passage 432 via the constant pressure relief valve 438 by being turned on.

Additionally, SMFL 428 is a two-position solenoid valve which connects the first fluid pressure passage 422 and the fluid pressure passage 434 to each other by being turned off and connects the first fluid pressure passage 422 and the fluid pressure passage 434 via the constant pressure relief valve 440 by being turned on. Similarly, SMR 430 is a two-position solenoid valve which connects the second fluid pressure passage 424 and the fluid pressure passage 436 to each other by being turned off and connects the second fluid pressure passage 424 and the fluid pressure passage 436 via the constant pressure relief valve 432 by being turned on.

A check valve 444 is provided between the first fluid pressure passage 422 and the fluid pressure passage 432 so as to permit a flow of fluid only in a direction from the first fluid pressure passage 422 to the fluid pressure passage 432. Similarly, a check valve 446 is provided between the first fluid pressure passage 422 and the fluid pressure passage 434 so as to permit a flow of fluid only in a direction from the first fluid pressure passage 422 to the fluid pressure passage 434. Similarly, a check valve 448 is provided between the second fluid pressure passage 424 and the fluid pressure passage 436 so as to permit a flow of fluid only in a direction from the second fluid pressure passage 424 to the fluid pressure passage 436.

A front right wheel holding solenoid 104 (hereinafter referred to as SFRH 104) is connected to the fluid pressure passage 432 corresponding to the front right wheel FR. Similarly, a front left wheel holding solenoid 106 (hereinafter referred to as SFLH 106) is connected to the fluid pressure passage 434 corresponding to the front right wheel FR, and a rear right wheel holding solenoid 108 (hereinafter referred to as SRRH 108) and a rear left holding solenoid 110 (hereinafter referred to as SRLH 110) are connected to the fluid pressure passage 436 which corresponds to the rear left and rear right wheels RL and RR, respectively. Hereinafter, these solenoid valves may be referred to as "holding solenoid S**H" as a whole.

A front right wheel pressure decreasing solenoid valve 112 (hereinafter referred to as SFRR 112) is connected to SFRH 104. Similarly, a front left wheel pressure decreasing solenoid valve 114 (hereinafter referred to as SFLR 114), a right rear wheel pressure decreasing solenoid valve 116 (hereinafter referred to as SRRR 116) and a rear left wheel pressure decreasing solenoid valve 118 (hereinafter referred to as SRLR 118) are connected to SFRH 104, SRRH 108 and the SRLH 110, respectively. Hereinafter, these solenoid valves may be referred to as "pressure decreasing solenoid S**R" as a whole.

Additionally, a wheel cylinder 120 of the front right wheel FR is connected to SFRH 104. Similarly, a wheel cylinder 122 of the front left wheel FR is connected to SFLH 106, a wheel cylinder 124 of the rear right wheel RR is connected to SRRH 106, and a wheel cylinder 126 of the rear left wheel RL is connected to SRLH 110.

Further, a check valve 128 is provided between the fluid pressure passage 432 and the wheel cylinder 120 so as to permit a flow of the fluid from the wheel cylinder 120 to the fluid pressure passage 432 by bypassing SFRH 104. Similarly, check valves 130, 132 and 134 are provided between the fluid pressure passage 434 and the wheel cylinder 122, between the fluid pressure passage 436 and the wheel cylinder 124 and between the fluid pressure passage 436 and the wheel cylinder 126 so as to permit a flow of the fluid bypassing SFLH 106, SRRH 108 and SRLH 110, respectively.

SFRH 104 is a two-position solenoid valve which connects the fluid pressure passage 432 and the wheel cylinder 120 to each other by being turned off and disconnects them from each other by being turned on. Similarly, SFLH 106, SRRH 108 and SRLH 110 are two-positional solenoid valves which close a path connecting the fluid pressure passage 434 to the wheel cylinder 122, a path connecting the fluid pressure passage 436 to the wheel cylinder 124 and a path connecting the fluid pressure passage 436 to the wheel cylinder 126, respectively.

A front pressure decreasing passage 450 is connected to the holding solenoid valves SFRR 112 and SFLR 114 of the front left and front right wheels. Further, a rear pressure decreasing passage 452 is connected to the holding solenoid valves SRRR 116 and SRLR 118 of the rear left and rear right wheels.

A front reservoir 454 and a rear reservoir 345 are connected to the front pressure decreasing passage 450 and the rear pressure decreasing passage 452, respectively. The front reservoir 454 and the rear reservoir 345 are connected to an inlet of the front pump 460 and an inlet of the rear pump 462 via check valves 456 and 458, respectively.

An outlet of the front pump 460 and an outlet of the rear pump 462 are connected to dampers 464 and 466, respectively, so as to absorb pulsation of a discharge pressure. The damper 464 is connected to a front right pump passage 468 provided to the front right wheel FR and a front left pump passage 470 provided to the front left wheel FL. The damper 466 is connected to the fluid pressure passage 436.

The front right pump passage 468 is connected to the fluid pressure passage 432 via a front right pump solenoid valve 472 (hereinafter referred to as SPFL 472). Additionally, the front left pump passage 470 is connected to the fluid pressure passage 434 via a front left pump solenoid valve 474 (hereinafter referred to as SPFR 474).

SPFL 472 is a two-position solenoid valve which connects the front right pump passage 468 and the fluid pressure passage 432 to each other by being turned off and disconnects them from each other by being turned on. Similarly, SPFR 474 is a two-position solenoid valve which connects the front left pump passage 470 and the fluid pressure passage 434 to each other by being turned off and disconnects them from each other by being turned on.

A constant pressure relief valve 476 is provided between the fluid pressure passage 432 and the front right pump passage 468 so as to permit a flow of fluid only in a direction from the fluid pressure passage 432 to the front right pump passage 468. A constant pressure relief valve 478 is provided between the fluid pressure passage 434 and the front left pump passage 470 so as to permit a flow of fluid only in a direction from the fluid pressure passage 434 to the front left pump passage 470.

The wheel speed sensors 136, 138, 140 and 142 are provided near the respective wheels. The ECU 10 detects rotational speed VW of each of the wheels based on the outputs of the wheel speed sensors 136 to 132. Additionally, a fluid pressure sensor 144 is provided to the second fluid pressure passage which is connected to the master cylinder 402. The ECU 10 detects the master cylinder pressure $P_{M/C}$ based on an output signal of the fluid pressure sensor 144.

A description will now be given of an operation of the brake force control apparatus according to the present embodiment. The brake force control apparatus according to the present embodiment achieves (1) a regular brake function, (2) an ABS function, and (3) a BA function by operating various solenoid valves provided in the fluid circuit.

The (1) regular brake function is achieved by turning off all of the solenoid valves provided in the brake force control apparatus as shown in FIG. 1. Hereinafter a state shown in FIG. 1 is referred to as a regular brake state. Additionally, a control for achieving the regular brake function in the brake force control function is referred to as a regular brake control.

In the regular brake state shown in FIG. 1, both the wheel cylinders 120 and 122 of the front left and front right wheels FL and FR are connected to the first hydraulic pressure chamber 404 of the master cylinder 402 via the first fluid pressure passage 422. Additionally, both the wheel cylinders 124 and 126 of the rear left and rear right wheels RL and RR are connected to the second hydraulic pressure chamber 406 of the master cylinder 402 via the second fluid pressure passage 424. In this case, the wheel cylinder pressure $P_{W/C}$ of the wheel cylinders 120 to 126 is controlled to be always equal to the master cylinder pressure $P_{M/C}$. Accordingly, the regular brake function can be achieved in the state shown in FIG. 1.

The (2) ABS function can be achieved by turning on the front pump 460 and the rear pump 462 and operating the holding solenoid valves SH and the pressure decreasing solenoid valves SR in response to requirements by the ABS. Hereinafter, a control to achieve the ABS function in the brake force control apparatus is referred to as ABS control.

The ECU 10 starts the ABS control when the vehicle is in a braking state and an excessive slip rate is detected in any one of the wheels. The ABS control is started in a condition where the brake pedal 12 is depressed, that is, in a condition where the master cylinder 402 is generating the master cylinder pressure $P_{M/C}$ which is a high pressure.

During execution of the ABS control, the master cylinder pressure $P_{M/C}$ is introduced into the fluid pressure passages 432 and 434 provided to the front right and front left wheels and the fluid pressure passage 436 provided to the rear left and rear right wheels. Accordingly, in this condition, if the holding solenoid valves SH are open and the pressure decreasing solenoid valves SR are closed, the wheel cylinder pressure $P_{W/C}$ for each of the wheels can be increased. Hereinafter, this state is referred to as (i) a pressure increasing mode.

Additionally, the wheel cylinder pressure $P_{W/C}$ for each wheel can be maintained by closing both the holding solenoid valves SH and the pressure decreasing solenoid valves SR while the ABS control is performed. Hereinafter, this state is referred to as (ii) a holding mode. Further, the wheel cylinder pressure $P_{W/C}$ for each wheel can be decreased by closing the holding solenoid valves SH and opening the pressure decreasing solenoid valves SR while the ABS control is performed. Hereinafter, this state is referred to as (iii) a pressure decreasing mode.

The ECU 10 controls the holding solenoid valves SH and the pressure decreasing solenoid valves SR so that the above-mentioned (i) pressure increasing mode, (ii) holding mode and (iii) pressure increasing mode are achieved, if necessary, in response to a slip state of each wheel while the ABS control is performed. When the holding solenoid valves SH and the pressure decreasing solenoid valves SR are controlled as mentioned above, the wheel cylinder pressure $P_{W/C}$ for each of the wheels is controlled to be a pressure which does not generate an excessive slip rate in the respective wheels. Thus, according to the above-mentioned control, the ABS function can be achieved in the brake force control apparatus.

During execution of the ABS control, the brake fluid in the wheel cylinders 120 to 126 enters the front reservoir 454 and the rear reservoir 345 through the front pressure decreasing passage 450 and the rear pressure decreasing passage 452 when the pressure decreasing mode is performed for each wheel. The brake fluid entering the front reservoir 454 and the rear reservoir 345 is pumped up by the front pump 460 and the rear pump 462, and is supplied to the fluid pressure passages 432, 434 and 436.

A part of the brake fluid supplied to the fluid pressure passages 432, 434 and 436 enters the wheel cylinders 120 to 126 when the pressure increasing mode is achieved. Additionally, the remainder of the brake fluid flows into the master cylinder 402 so as to compensate for the brake fluid which has flowed out. Thus, according to the present embodiment, an excessive travel of the brake pedal 12 in not generated during the ABS control.

Figure 2:
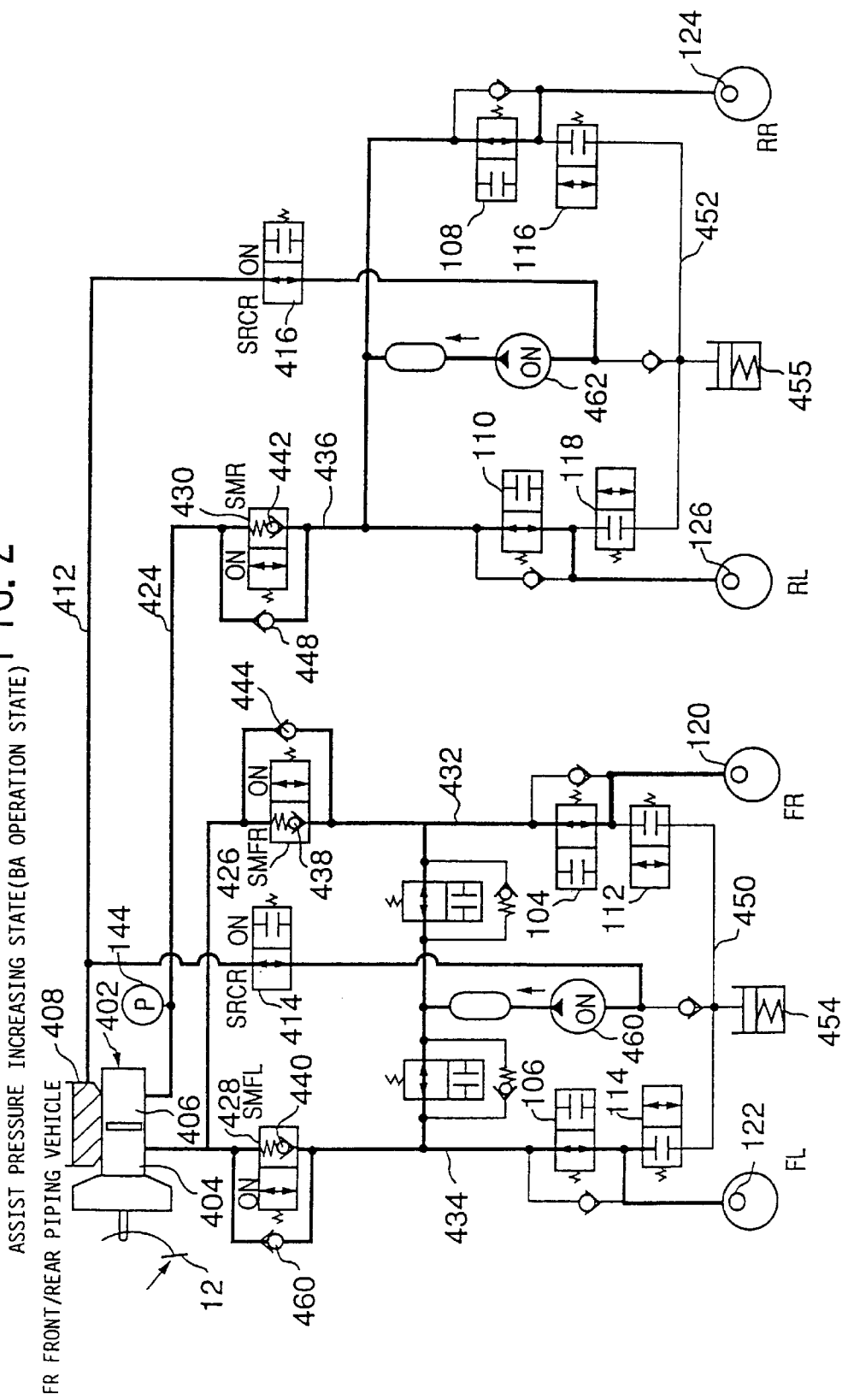
FIG. 2 is an illustration showing an assist pressure increasing state which is achieved during execution of BA control in the brake force control apparatus according to the embodiment of the present invention.
Figure 3:
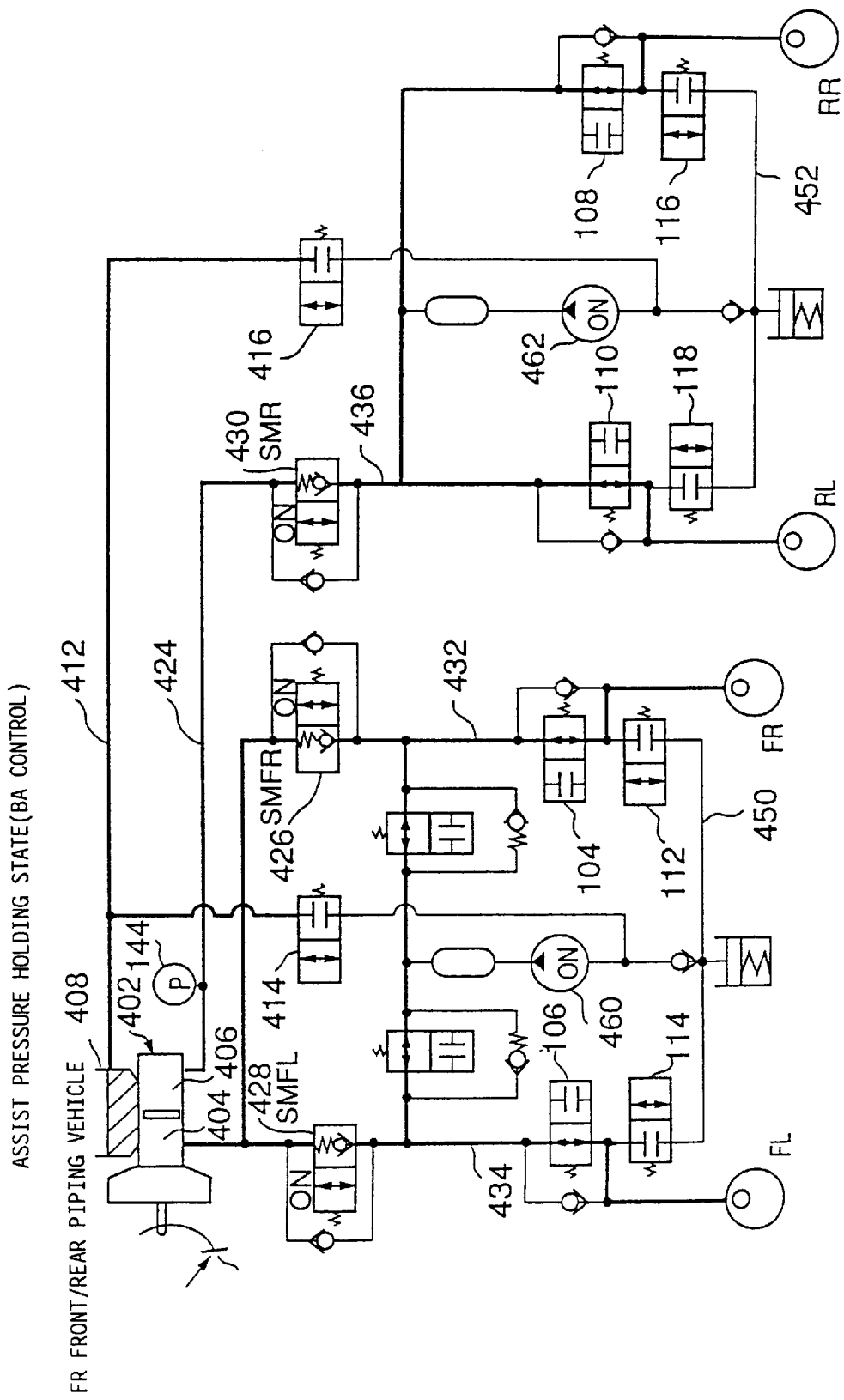
FIG. 3 is an illustration showing an assist pressure holding state which is achieved during execution of the BA control in the brake force control apparatus according to the embodiment of the present invention.
Figure 4:
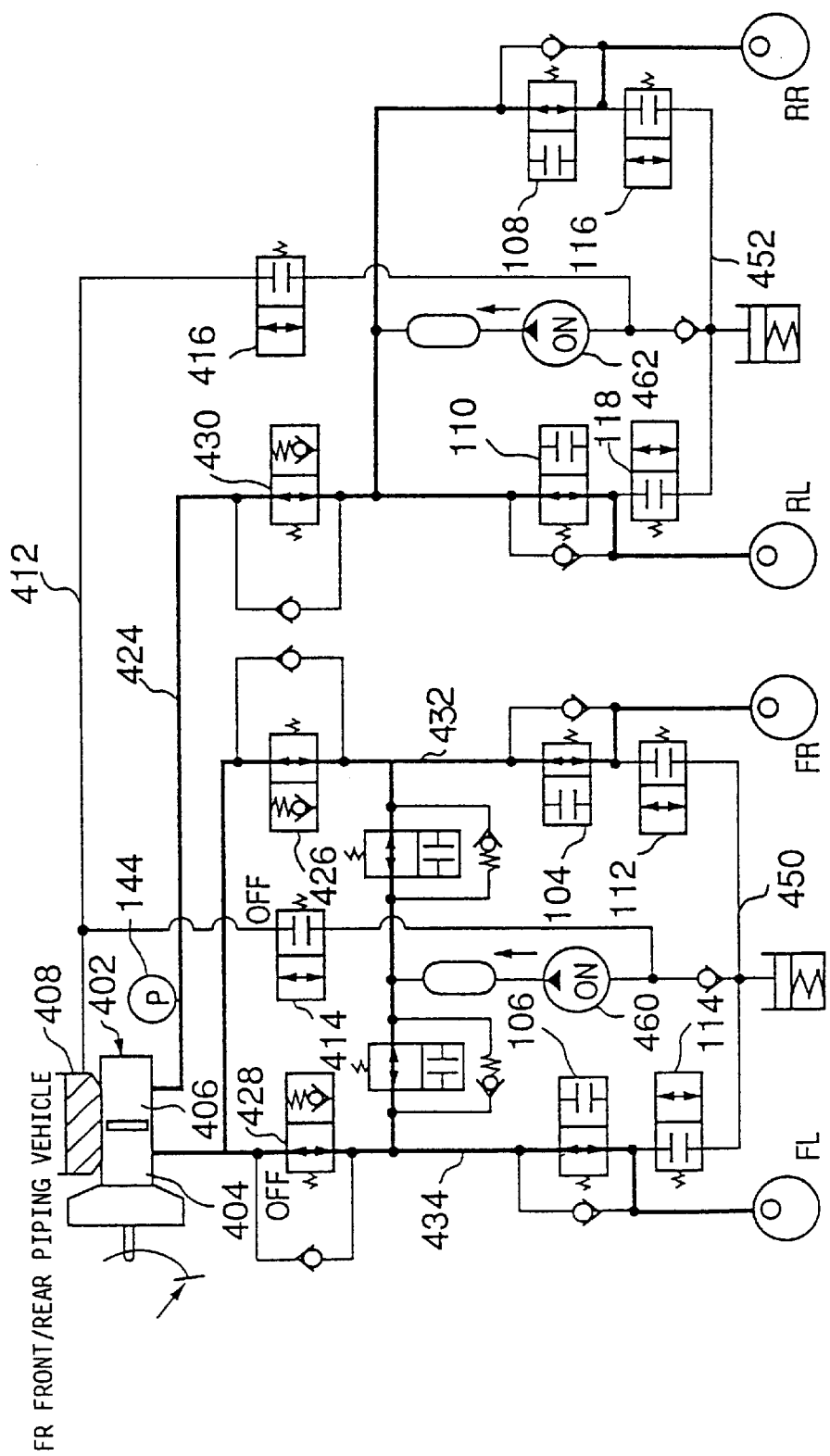
FIG. 4 is an illustration showing an assist pressure decreasing state which is achieved during execution of the BA control or a BA+ABS control in the brake force control apparatus according to the embodiment of the present invention.

FIGS. 2 to 4 show states of the brake force control apparatus to achieve the (3) BA function. The ECU 10 achieves the BA function by appropriately establishing one of the states shown in FIGS. 2 to 4 after a brake operation which requires a rapid increase in the brake force, that is, the emergency brake operation is performed by the driver. Hereinafter, a control to achieve the BA function in the brake force control apparatus is referred to as a BA control.

FIG. 2 shows an assist pressure increasing state which is achieved during execution of the BA control. The assist pressure increasing state is achieved when the wheel cylinder pressure $P_{W/C}$ of each wheel is required to be increased during execution of the BA control.

In the system of the present embodiment, the assist pressure increasing state is achieved by turning on the reservoir cut solenoids SRCR 414, SRCR 416 and the master cut solenoids SMFR 426, SMFL 428, SMR 430 and also turning on the front pump 460 and the rear pump 462 as shown in FIG. 2. Detailed description will be given later of the timing for turning on each of the pumps 460, 462.

When the assist pressure increasing state shown in FIG. 2 is achieved, the brake fluid stored in the reservoir tank 408 is pumped up by the front pump 460 and the rear pump 462, and is supplied to the fluid pressure passages 432, 434, 436.

In the assist pressure increasing state, a flow of the brake fluid in a direction from the fluid pressure passages 432, 434 and 436 to the master cylinder 402 is prevented by SMFR 426, SMFL 428 and SMR 430 until the pressure within the fluid pressure passages 432, 434, 436 exceeds a valve opening pressure of the constant pressure relief valves 438, 440, 442 and becomes higher than the master cylinder pressure $P_{M/C}$.

Accordingly, after the assist pressure increasing state shown in FIG. 2 is achieved, a fluid pressure higher than the master cylinder pressure $P_{M/C}$ is generated in the fluid pressure passages 432, 434, 436. In the assist pressure increasing state, the wheel cylinders 120 to 126 are connected to the respective fluid pressure passages 432, 434, 436. Accordingly, after the assist pressure increasing state is achieved, the wheel cylinder pressure $P_{W/C}$ of each of the wheels is rapidly increased to a pressure exceeding the master cylinder pressure $P_{M/C}$ by using the front pump 460 and the rear pump 462 as fluid pressure sources.

In the assist pressure increasing state shown in FIG. 2, the fluid pressure passages 432, 434, 436 are connected to the master cylinder 402 via check valves 444, 446, 448, respectively. Thus, when the master cylinder pressure $P_{M/C}$ is higher than the wheel cylinder pressure $P_{W/C}$ of each of the wheels, the wheel cylinder pressure $P_{W/C}$ can be increased by using the master cylinder 402 as a fluid pressure source even in the BA operating state.

FIG. 3 shows an assist pressure holding state which is achieved during execution of the BA control. The assist pressure holding state is achieved when the wheel cylinder $P_{W/C}$ of each of the wheels is required to be maintained during execution of the BA control, that is, when (IV) an assist pressure holding mode is required during execution of the BA control.

The assist pressure holding mode is achieved by turning on the master cylinder cut solenoids SMFR 426, SMFL 428, SMR 430 and also turning on the front pump 460 and the rear pump 462 as shown in FIG. 3.

In the assist pressure holding state shown in FIG. 3, the front pump 460 and reservoir tank 408 are disconnected from each other by SRCF 414. Similarly, the rear pump 462 and the reservoir tank 408 are disconnected from each other by the SRCR 416. Accordingly, in the assist pressure holding state, the brake fluid is not pumped up to the fluid pressure passage 432, 434, 436 by the front pump 460 and the rear pump 462.

Additionally, in the assist pressure holding state shown in FIG. 3, the fluid pressure passages 432, 434, 436 are substantially disconnected from the master cylinder 402 by SMFR 426, SMFL 428, SMR 430, respectively. According to the assist pressure holding state shown in FIG. 3, the wheel cylinder pressure $P_{W/C}$ for all of the wheel can be maintained to be a constant value.

FIG. 4 shows an assist pressure decreasing state which is achieved during execution of the BA control. The assist pressure decreasing state is achieve when the wheel cylinder pressure $P_{W/C}$ of each of the wheels is needed to be decreased during execution of the BA control, that is, when an (III) assist pressure decreasing mode or a (VI) assist pressure moderately decreasing mode is required to be achieved during execution of the BA control. The assist pressure decreasing state is achieved by turning on the front pump 460 and the rear pump 462 as shown in FIG. 4.

In the assist pressure decreasing state shown in FIG. 4, the front pump 460 and the rear pump 462 are disconnected from the reservoir tank 408. Accordingly, the brake fluid is not pumped up to the fluid pressure passages 432, 434, 436 by the front pump 460 and the rear pump 462.

Additionally, in the assist pressure decreasing state, the wheel cylinders 120 to 126 of all of the wheels are connected to the master cylinder 402. Accordingly, after the assist pressure decreasing state is achieve, the wheel cylinder $P_{W/C}$ of all of the wheel can be decreased down to the master cylinder pressure $P_{M/C}$ as a lower limit.

Figure 5:
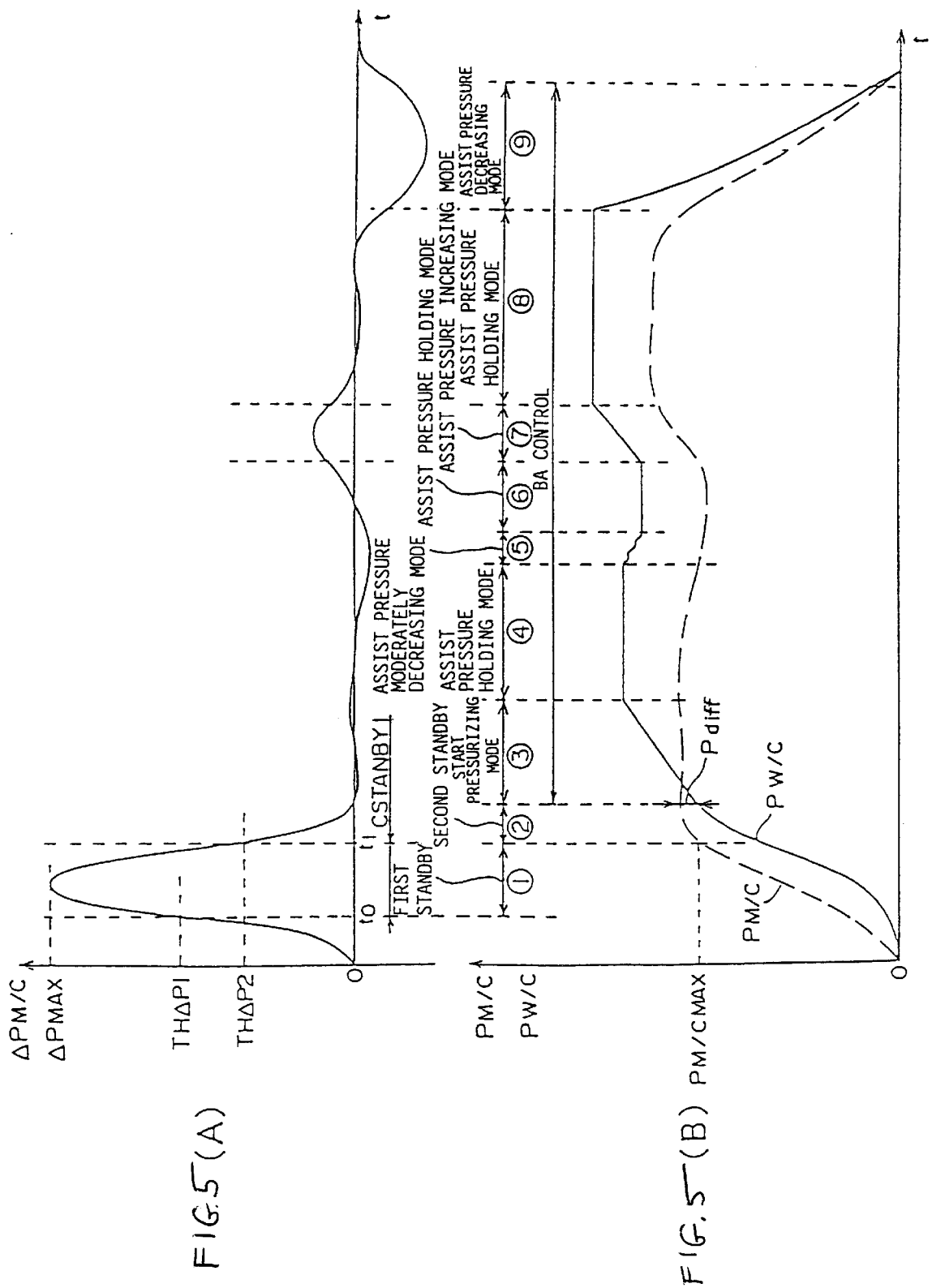
FIG. 5-(A) is a graph showing changes generated in a change rate $\Delta P_{M/C}$ of a master cylinder pressure. $P_{M/C}$ when an emergency brake operation is performed in the brake force control apparatus according to the embodiment of the present invention.

FIG. 5 shows an example of a time chart which is developed when the emergency brake operation is performed by the driver. A curve shown in FIG. 5-(A) shows an example of a change generated in an amount of change $\Delta P_{M/C}$ of the master cylinder pressure $P_{M/C}$ per unit time (hereinafter referred to as a change rate $\Delta P_{M/C}$). Additionally, curves shown by a dotted line and a solid line in FIG. 5-(B) show examples of changes generated in the master cylinder pressure $P_{M/C}$ and the wheel cylinder pressure $P_{W/C}$, respectively, in the same condition. In the system of the present embodiment, the master cylinder pressure $P_{M/C}$ and the change rate $\Delta P_{M/C}$ is a characteristic value of the amount of operation of the brake pedal 12 and the operating speed of the brake pedal 12, respectively.

When the emergency brake operation is performed by the driver, the master cylinder pressure $P_{M/C}$ increases to an appropriate pressure after the brake operation is started as shown in FIG. 5-(B) by the dotted line. At this time, the change rate $\Delta P_{M/C}$ of the master cylinder pressure $P_{M/C}$ increases toward a maximum value $\Delta P_{MAX}$ in synchronization with the rapid increase in the master cylinder pressure $P_{M/C}$ after start of the brake operation. Additionally, the change rate $\Delta P_{M/C}$ decreases to a value near zero in synchronization with convergence of the master cylinder pressure $P_{M/C}$ to an appropriate value.

As described above, the ECU 10 performs the BA control when the emergency brake operation by the driver is detected. When the ECU 10 determines whether or not the emergency brake operation is being performed by the driver, the ECU 10 first detects an operation of the brake pedal 12 which exceeds a predetermined speed. More specifically, the ECU 10 detects a value of the change rate $\Delta P_{M/C}$ which is greater than a first predetermined rate TH$\Delta$P1.

When the ECU 10 detects a value of the change rate $\Delta P_{M/C}$ which satisfies a relationship $\Delta P_{M/C}$>TH$\Delta$P1, the ECU 10 determines that it is possible that the emergency brake operation is being performed (hereinafter, this determination is referred to as a necessary condition determination), and shifts to the first standby state (during a period ① shown in FIG. 5-(B)). The ECU 10 counts a time ($t_1-t_0$=CSTANDBY1) taken for the change rate $\Delta P_{M/C}$ to decrease below the second predetermined rate TH$\Delta$P2 after the shift to the first standby state. If the elapsed time CSTANDBY1 is within a predetermined range, the ECU 10 determines that the emergency brake operation is being performed by the driver (hereinafter, this determination is referred to as a first sufficient condition determination), and shifts to the second standby state (during a period ② shown in FIG. 5-(B)).

In the brake force control apparatus of the present embodiment, while the master cylinder pressure $P_{M/C}$ is rapidly increasing, a relatively large difference Pdiff is generated between the master cylinder pressure $P_{M/C}$ and the wheel cylinder pressure $P_{W/C}$. In such a situation, the wheel cylinder pressure $P_{W/C}$ can be rapidly increased by using the master cylinder 402 as a fluid pressure source rather than by using pumps 460, 462 as a fluid pressure source.

Accordingly, the wheel cylinder pressure $P_{W/C}$ can be rapidly increased by maintaining the regular brake control rather than starting the BA control after the emergency brake operation is stated until the difference Pdiff increases to a sufficiently small value. Thus, after having shifted to the second standby state, the ECU 10 determines whether or not the difference Pdiff has decreased to the sufficiently small value (hereinafter, this determination is referred to as a second sufficient condition determination), and starts the BA control when the difference Pdiff has decreased to the sufficiently small value. If the BA control is started with such timing, the wheel cylinder pressure $P_{W/C}$ can be effectively and rapidly increased after start of the emergency brake operation.

As described above, when it is determined that a necessary condition for detecting the emergency brake operation is established (in other words, it is determined that a value of the change rate $\Delta P_{M/C}$ which satisfies a relationship $\Delta P_{M/C}$>TH$\Delta$P1 is detected) by the process of the necessary condition determination, it is determined that a sufficient condition for detecting the emergency brake operation is established (in other words, it is determined that the elapsed time CSTANDBY1 is within the predetermined range) by the process of the first sufficient condition determination, and it is determined that fluid pressure is needed to be supplied by means of the pumps 460, 462 (in other words, it is determined that the difference Pdiff has decreased to the sufficiently small value) by the process of the second sufficient condition determination, high-pressure brake fluid is supplied to the wheel cylinders 120 to 126 from the pumps 460, 462. Accordingly, it is possible to generate a high brake force when the driver really intends to perform the emergency brake operation. As a result, the accuracy of the brake force control can be increased.

After the BA control is started in the brake force control apparatus of the present embodiment, a (I) start pressure increasing mode is performed first (during a period ③ shown in FIG. 5-(B)). The (I) start pressure increasingmode is achieved by maintaining the assist pressure increasing mode shown in FIG. 2 for a predetermined increasing time $T_{STA}$.

As described above, the wheel cylinder pressure $P_{W/C}$ of each of the wheels is increased to a pressure exceeding the master cylinder pressure $P_{M/C}$ by using the pumps 460, 462 as a fluid pressure source in the assist pressure increasing state. Accordingly, the wheel cylinder pressure $P_{W/C}$ of each of the wheels is rapidly increased to a pressure exceeding the master cylinder pressure $P_{M/C}$ when the start pressure increasing mode is performed after start of the BA control. Hereinafter, a differential pressure between the wheel cylinder pressure $P_{W/C}$ and the master cylinder pressure $P_{M/C}$ generated during execution of the BA control is referred to as an assist pressure Pa.

In the present embodiment, the pressure increasing time $T_{STA}$ is calculated based on the maximum value $\Delta P_{MAX}$ of the change rate $\Delta P_{M/C}$ generated in the master cylinder pressure $P_{M/C}$ during the process of the emergency brake operation. Specifically, the pressure increasing time $T_{STA}$ is set to a greater value as the maximum value $\Delta P_{MAX}$ of the change rate $\Delta P_{M/C}$ increases, and is set to a smaller value as the maximum value $\Delta P_{MAX}$ decreases.

The maximum value $\Delta P_{MAX}$ of the change rate $\Delta P_{M/C}$ becomes a greater value as the driver intends to more rapidly increase the brake force. Accordingly, if the maximum value $\Delta P_{MAX}$ is a large value, it is appropriate to increase the wheel cylinder pressure $P_{W/C}$ to a pressure which is higher than the master cylinder pressure $P_{M/C}$ after start of the BA control.

If the pressure increasing time $T_{STA}$ is set based on the maximum value $\Delta P_{MAX}$ as described above, it is possible to increase the wheel cylinder pressure $P_{W/C}$ to a pressure higher than the master cylinder pressure $P_{M/C}$, that is, to generate a higher assist pressure Pa as the driver intends to more rapidly increase the brake force. Thus, according to the brake force control apparatus of the present embodiment, it is possible to immediately generate the wheel cylinder pressure $P_{W/C}$ which accurately reflects the driver's intention after start of the pressure increasing mode.

After the (I) start pressure increasing mode is finished in the brake force control apparatus of the present embodiment, (II) an assist pressure increasing mode, the (III) assist pressure increasing mode, the (IV) assist pressure holding mode, (V) an assist pressure moderately increasing mode, and the (VI) assist pressure moderately decreasing mode are selectively achieved in accordance with a brake operation performed by the driver.

When the master cylinder pressure $P_{M/C}$ is rapidly increased during execution of the BA control, it can be determined that the driver requires a further large brake force. In this case, the (II) assist pressure increasing mode is performed in the brake force control apparatus of the present embodiment (during a period ⑦ shown in FIG. 5-(B)).

The (II) assist pressure increasing mode is achieved by setting the brake force control apparatus in the assist pressure increasing state as in the case of the (I) start pressure increasing mode. The wheel cylinder pressure $P_{W/C}$ of each of the wheels can be rapidly increased toward the accumulator pressure $P_{ACC}$ in the assist pressure increasing state. Thus, according to the above operation, it is possible to accurately reflect the driver's intention to the wheel cylinder pressure $P_{W/C}$.

When the master cylinder pressure $P_{M/C}$ is rapidly decreased during execution of the BA control, it can be determined that the driver intends to rapidly decrease the brake force. In this case, the (III) assist pressure decreasing mode is performed in the present embodiment (during a period ⑨ shown in FIG. 5-(B)).

The assist pressure decreasing mode is achieved by maintaining the assist pressure increasing state shown in FIG. 4. It is possible to rapidly decrease the wheel cylinder pressure $P_{W/C}$ of each of the wheels toward the master cylinder $P_{M/C}$ in the assist pressure decreasing state as described above. Thus, according to the above operation, it is possible to accurately reflect the driver's intention to the wheel cylinder $P_{W/C}$.

When the master cylinder pressure $P_{M/C}$ is maintained to be an approximately constant during execution of the BA control, it can be determined that the driver intends to hold the brake force. In this case, the (IV) assist pressure holding mode is performed in the present embodiment (during periods ④ and ⑧ shown in FIG. 5-(B)).

The assist pressure holding mode is achieved by maintaining the assist pressure holding state shown in FIG. 3. The wheel cylinder pressure $P_{W/C}$ of each of the wheels can be maintained at a constant value in the assist pressure holding state as described above. Thus, according to the above operation, it is possible to accurately reflect the driver's intention to the wheel cylinder pressure $P_{W/C}$.

When the master cylinder pressure $P_{M/C}$ is moderately increased during execution of the BA control, it can be determined that the driver intends to moderately increase the brake force. In this case, the (V) assist pressure moderately increasing mode (not shown) is performed in the present embodiment. The assist pressure moderately increasing mode is achieved by alternately and repeatedly forming the assist pressure increasing state shown in FIG. 2 and the assist pressure holding state shown in FIG. 3.

The wheel cylinder pressure $P_{W/C}$ of each of the wheels can be increased stepwise toward the accumulator pressure $P_{ACC}$ in the assist pressure moderately increasing mode. Thus, according to the above operation, it is possible to accurately reflect the driver's intention to the wheel cylinder pressure $P_{W/C}$.

When the master cylinder pressure $P_{M/C}$ is moderately decreased during execution of the BA control, it can be determined that the driver intends to moderately decrease the brake force. In this case the (VI) assist pressure moderately decreasing mode is performed (during a period ⑤ shown in FIG. 5-(B)).

The assist pressure moderately decreasing mode is achieved by alternately and repeatedly forming the assist pressure decreasing state shown in FIG. 4 and the assist pressure holding mode shown in FIG. 3. The wheel cylinder pressure $P_{W/C}$ can be decreased toward the master cylinder pressure $P_{M/C}$ in a step-wise manner. Thus, according to the above operation, it is possible to accurately reflect the driver's intention to the wheel cylinder pressure $P_{W/C}$.

According to the above-mentioned operations, it is possible to immediately generate an assist pressure Pa to which the driver's intention is accurately reflected after start of the emergency brake operation performed by the driver. Thus, according to the brake force control apparatus of the present embodiment, it is possible to change a trend of increase in the brake force in accordance with the driver's intention.

Additionally, according to the above-mentioned operations, when a brake operation is performed by the driver after the assist pressure Pa is generated in the (I) start pressure increasing mode, it is possible to increase or decrease the wheel cylinder pressure $P_{W/C}$ in accordance with the brake operation. Thus, it is possible to correctly reflect the driver's intention to the wheel cylinder pressure $P_{W/C}$ while always maintaining the assist pressure Pa to be an approximately constant value during execution of the BA control.

In the brake force control apparatus according to the present embodiment, after the above-mentioned BA control is started, an excessive slip rate may be generated in any one of the wheels as the wheel cylinder pressure $P_{W/C}$ is rapidly increased. In such a case, the ECU 10 starts the BA+ABS control. A description will now be given, with reference to FIGS. 4, 6, and 7, of an operation of the brake force control apparatus associated with the BA+ABS function.

After the BA+ABS control is started and when a brake operation to increase a brake force is performed by the driver, the brake force control apparatus according to the present embodiment attempts to control the wheel cylinder pressure $P_{W/C}$ for an objective wheel of the ABS control (hereinafter referred to as ABS objective wheel) to be at a pressure requested by the ABS control and to increase the wheel cylinder pressure $P_{W/C}$ of other wheels.

Figure 6:
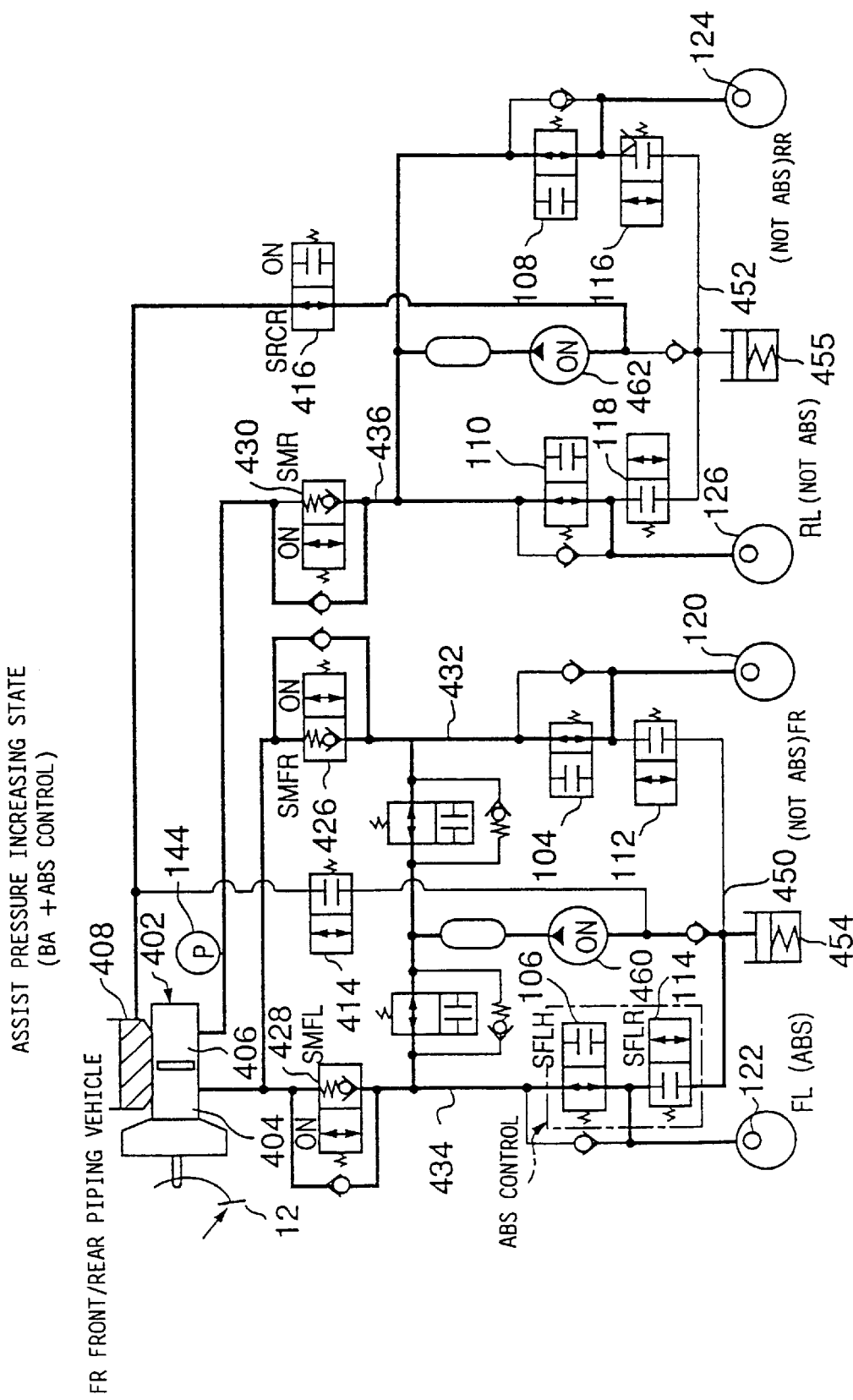
FIG. 6 is an illustration showing an assist pressure increasing state which is achieved during execution of the BA+ABS control in the brake force control apparatus according to the embodiment of the present invention.

FIG. 6 shows a state which is set to achieve the above-mentioned function during execution of the BA+ABS control in which the front left wheel FL is the objective wheel of the ABS control. Hereinafter, the state shown in FIG. 6 is referred to as an assist pressure increasing (ABS) state.

The assist pressure increasing (ABS) state can be set by turning on the rear reservoir cut solenoid valve SRCR 416 and the master cur the master cut solenoid valves SMFR 426, SMFL 428 and SMR 430 and turning on the front pump 460 and the rear pump 462, and appropriately controlling, if necessary, the holding solenoid valve SFLH 106 and the pressure decreasing solenoid valve SFLR 114 corresponding to the front left wheel FL.

In the assist pressure increasing (ABS) state, similar to the assist pressure increasing state shown in FIG. 2, the brake fluid discharged from the rear pump 462 is supplied to the wheel cylinders 124 and 126 corresponding to the rear left and rear right wheels RL and RR. Accordingly, when the assist pressure increasing (ABS) state is set, the wheel cylinder pressure $P_{W/C}$ of the rear left and rear right wheels RL and RR is increased similar to the case in which the assist pressure increasing state is set during the BA control.

The BA+ABS control in which the front left wheel FL is set to be an objective wheel of the ABS control is started by execution of the (ii) pressure decreasing mode for the front left wheel FL. Accordingly, the brake fluid enters the front reservoir 454 simultaneously when the BA+ABS control is started. In the assist pressure increasing (ABS) state shown in FIG. 6, the front pump 460 suctions and delivers the thus entering brake fluid in the front reservoir 454.

The brake fluid delivered by the front pump 460 is mainly supplied to the wheel cylinder 120 corresponding to the front right wheel FR, and is also supplied to the wheel cylinder 122 when the (i) pressure increasing mode is performed. According to the above control, the wheel cylinder pressure $P_{W/C}$ corresponding to the front right wheel FR can be increased similar to a case in which the assist pressure increasing state is set during the BA control, while the wheel cylinder pressure $P_{W/C}$ corresponding to the front left wheel FL is controlled to be an appropriate value so that an excessive slip rate is not generated in the front left wheel FL.

As mentioned above, according to the assist pressure increasing (ABS) state shown in FIG. 6, the wheel cylinder pressure $P_{W/C}$ for the front right wheel FR and the rear left and rear right wheels RL and RR which are not set as the objective wheel of the ABS control can be rapidly increased as is in the case where the assist pressure increasing state is set during the BA control, while the wheel cylinder pressure $P_{W/C}$ for the front left wheel FL which is the objective wheel of the ABS control is controlled to a pressure responding to a request by the ABS control.

After the BA+ABS control is started, the brake force control apparatus according to the present embodiment controls the wheel cylinder pressure $P_{W/C}$ corresponding to the objective wheel of the ABS control to a pressure responding to the ABS control while an attempt is made to maintain the wheel cylinder pressure $P_{W/C}$ of other wheels.

Figure 7:
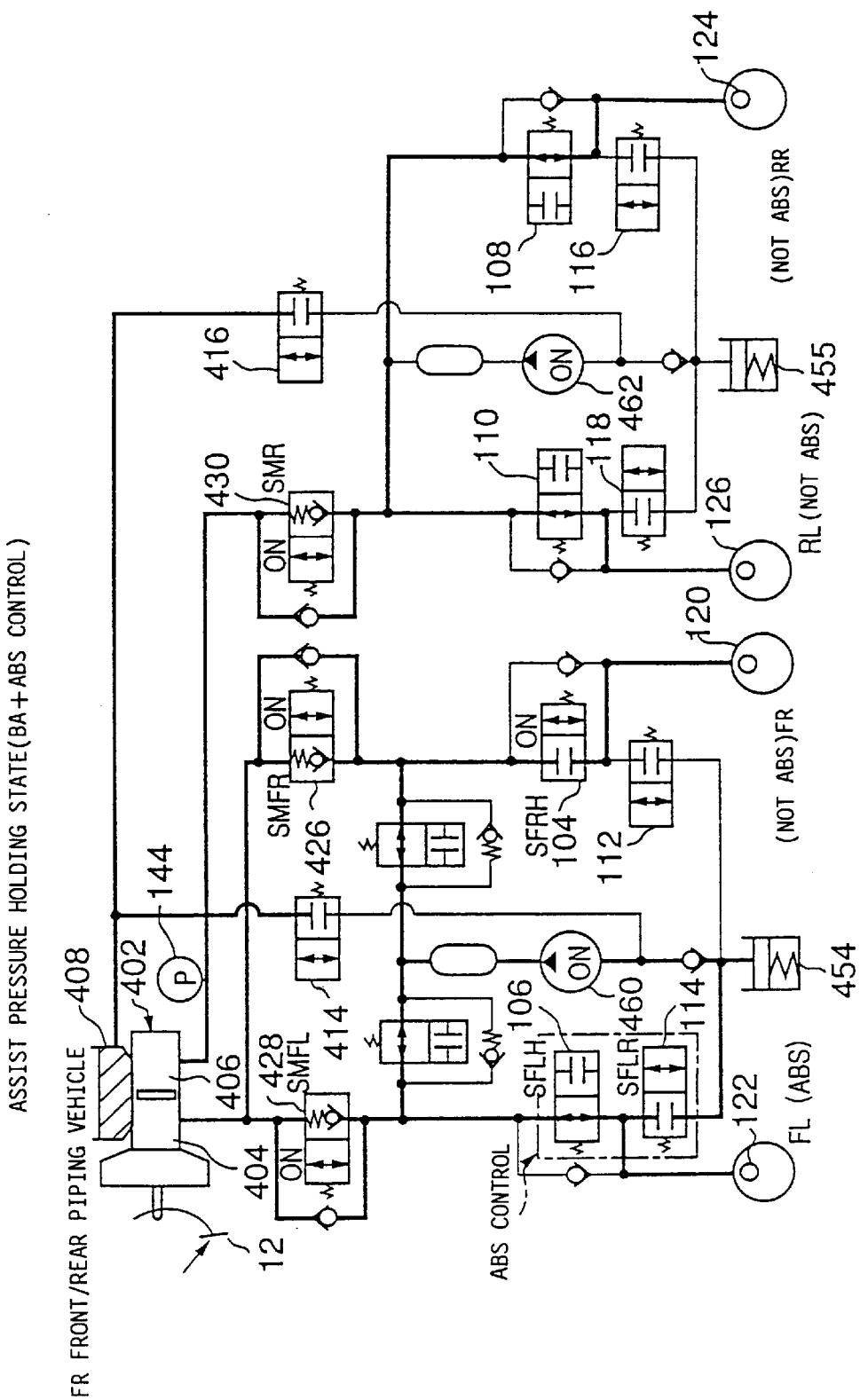
FIG. 7 is an illustration showing an assist pressure holding state which is achieved during execution of the BA+ABS control in the brake force control apparatus according to the embodiment of the present invention.

FIG. 7 shows a state which is set to achieve the above-mentioned function during execution of the BA+ABS control in which the front left wheel FL is set to the objective wheel of the ABS control. Hereinafter, the state shown in FIG. 7 is referred to as an assist pressure holding (ABS) state.

The assist pressure holding (ABS) state can be set by turning on the master cut solenoid valves SMFR 426, SMFL 428 and SMR 430, and turning on the front pump 460 and the rear pump 462, and turning on the holding solenoid valve SFRH 104 corresponding to the front right wheel FR, and appropriately controlling, if necessary, the holding solenoid valve SFLH 106 and the pressure decreasing solenoid valve SFLR 114 corresponding to the front left wheel FL.

In the assist pressure holding (ABS) state, similar to the assist pressure increasing state shown in FIG. 3, the rear pump 462 is disconnected from the reservoir tank 408. Additionally, the fluid pressure passage 430 is substantially disconnected from the master cylinder 402 as is in the case where the assist pressure holding state is set as shown in FIG. 3. Accordingly, when the assist pressure holding (ABS) state is set, the wheel cylinder pressure $P_{W/C}$ for the rear left and rear right wheels RL and RR is maintained at a constant value as is in the case where the assist pressure holding state is achieved during the BA control.

The brake fluid discharged from the wheel cylinder 122 is stored in the front reservoir 454 at the same time when the assist pressure holding (ABS) state is set or before the assist pressure holding (ABS) state is set. The front pump 460 suctions and delivers the brake fluid stored in the front reservoir 454 while the assist pressure holding (ABS) state is set.

In the assist pressure holding state, the wheel cylinder 120 corresponding to the front right wheel FR is disconnected from the front pump 460 by SFRH 104. Thus, the brake fluid delivered by the front pump 460 is supplied only to the wheel cylinder 122 corresponding to the front left wheel FL. Additionally, a flow of the brake fluid from the front pump 460 to the wheel cylinder 122 is permitted only when the (i) pressure increasing mode is performed with respect to the front left wheel FL. According to the above control, the wheel cylinder pressure $P_{W/C}$ for the front right wheel FR is maintained at a constant value while the wheel cylinder pressure $P_{W/C}$ for the front left wheel FL is controlled to be an appropriate pressure which does not generate an excessive slip rate in the front left wheel FL.

As mentioned above, according to the assist pressure holding (ABS) state shown in FIG. 7, the wheel cylinder pressure $P_{W/C}$ for the front right wheel FR and the rear left and rear right wheels RL and RR which are not the objective wheel of the ABS controls can be maintained at a constant value as is in the case where the assist pressure holding state is set during the BA control, while the wheel cylinder pressure $P_{W/C}$ for the front left wheel FL which is the objective wheel of the ABS control is controlled to be an appropriate pressure responding to a request by the ABS control.

After the BA+ABS control is started, the brake force control apparatus according to the present embodiment controls the wheel cylinder pressure $P_{W/C}$ corresponding to the objective wheel of the ABS control to a pressure responding to a request by the ABS control while an attempt is made to decrease the wheel cylinder pressure $P_{W/C}$ of other wheels.

The above-mentioned function can be achieved by appropriately controlling the holding solenoid valves SH and the pressure decreasing solenoid valves SR while the assist pressure decreasing state shown in FIG. 4 is achieved so that one of the (i) pressure increasing mode, the (ii) holding mode and the (iii) pressure decreasing mode is achieved for the objective wheel of the ABS control. Hereinafter, the state in which the above-mentioned control is performed is referred to as an assist pressure decreasing (ABS) state.

That is, when the assist pressure decreasing (ABS) state is set, each of the holding solenoid valves is connected to the master cylinder 402. Accordingly, if the assist pressure decreasing (ABS) state is set, the wheel cylinder pressure $P_{W/C}$ corresponding to the wheels which are not the objective wheel of the ABS control can be decreased down to the master cylinder as a lower limit. Additionally, as for the objective wheel of the ABS control, the wheel cylinder pressure $P_{W/C}$ can be maintained or decreased by setting the (ii) holding mode or the (iii) pressure decreasing mode.

The assist pressure decreasing (ABS) state is set when the driver intends to decrease the brake force, that is, when there is no need to increase the wheel cylinder pressure $P_{W/C}$ for any one of the wheels. Accordingly, the wheel cylinder pressure $P_{W/C}$ of the objective wheel of the ABS control can be appropriately controlled to a pressure required by the BA+ABS control by achieving the (ii) holding mode and the (iii) pressure decreasing mode.

Thus, according to the above-mentioned assist pressure decreasing (ABS) state, the wheel cylinder pressure $P_{W/C}$ for the front right wheel FR and the rear left and rear right wheels RL and RR which are not the objective wheel of the ABS controls can be decreased down to the master cylinder pressure $P_{M/C}$ as a lower limit as is in the case where the assist pressure decreasing state is set during the BA control, while the wheel cylinder pressure $P_{W/C}$ for the front left wheel FL which is the objective wheel of the ABS control is controlled to be an appropriate pressure responding to a request by the ABS control.

As mentioned-above, in the brake force control apparatus according to the present embodiment, after the BA control is started and when an excessive slip rate is generated in any one of the wheels, the (1)ABS function and the (2)BA function can be simultaneously performed, the ABS function controlling the wheel cylinder pressure $P_{W/C}$ for the objective wheel of the ABS control to an appropriate pressure requested by the ABS control, and the BA function increasing or decreasing the wheel cylinder pressure $P_{W/C}$ for a wheel which is not the objective wheel of the ABS control within a high-pressure area relative to the master cylinder pressure $P_{M/C}$ in response to a brake operation performed by the driver.

In the brake force control apparatus having the above construction, the brake fluid stored in the reservoir tank 408 must be pumped up by the front pump 460 and the rear pump 462 and supplied to the fluid pressure passages 432, 434, 436 in order to achieve the assist pressure increasing state of FIG. 2 in the BA control.

However, since each of the pumps 460, 462 is a mechanism including rotational elements, the pumps 460, 462 cannot immediately increase a pressure of the brake fluid after having been started due to inertia of the elements and so it takes a relatively long time for the pressure to be increased to a predetermined high pressure. Accordingly, if the BA control is started during the above period, it is difficult to immediately increase the wheel cylinder pressure $P_{W/C}$, If the difference Pdiff between the master cylinder pressure $P_{M/C}$ and the wheel cylinder pressure $P_{W/C}$ generated due to the emergency brake operation by the driver is relatively large, the master cylinder 402 can be used as a fluid pressure source as described with reference to FIG. 5. However, if the difference Pdiff is relatively small, the above-mentioned problem is particularly serious because the master cylinder 402 cannot be used as a fluid pressure source.

The brake force control apparatus according to the present embodiment can immediately increase the wheel cylinder pressure $P_{W/C}$ after start of the BA control by starting the operation of the front pump 460 and the rear pump 462 prior to start of the BA control. A description will now be given of a process performed by the ECU 10 with reference mainly to FIGS. 5 and 8.

Figure 8:
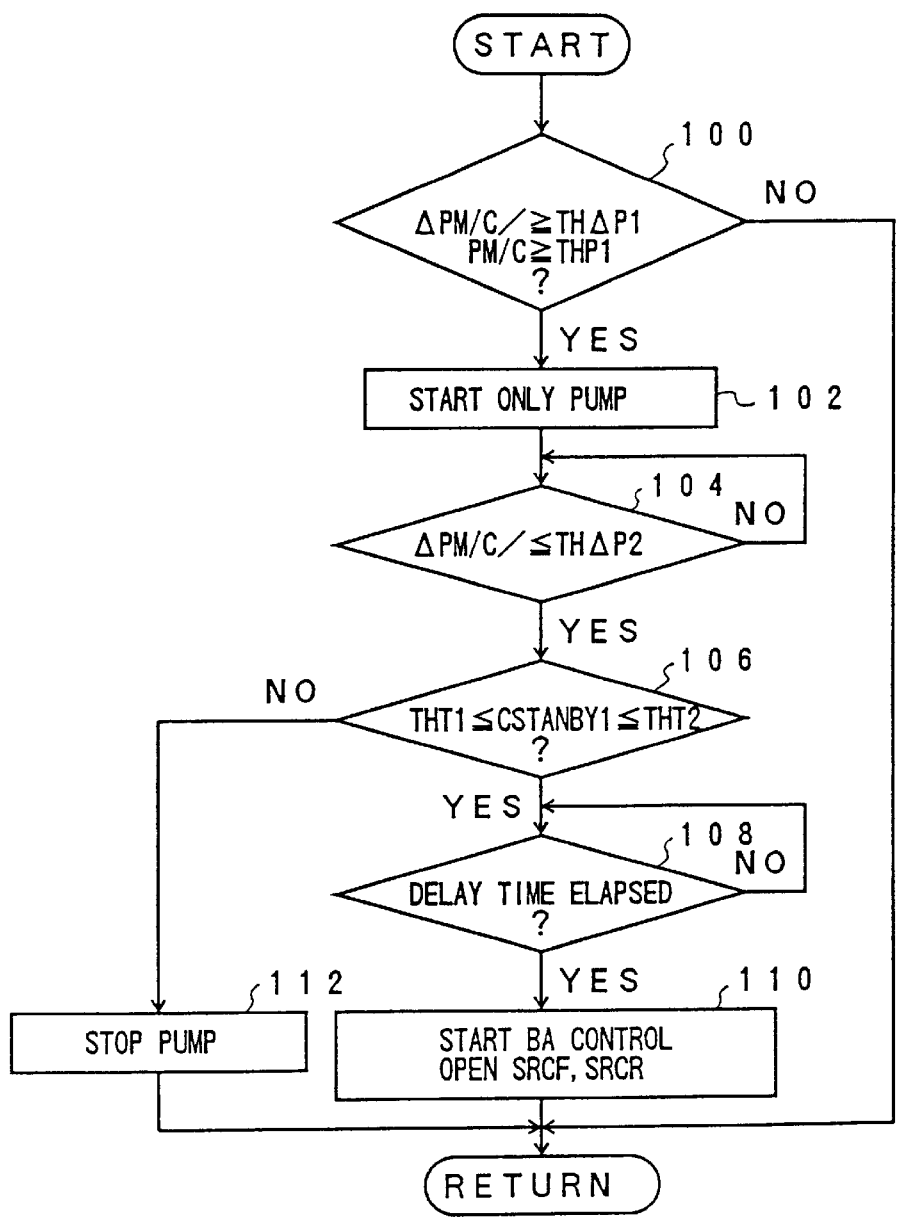
FIG. 8 is a flowchart of an example of a pump control routine performed to achieve the BA control in the brake force control apparatus according to the embodiment of the present invention.

FIG. 8 shows a flowchart of an example a routine executed by the ECU 10 to determine timing for starting the operation of each of the pumps 460, 462. The routine shown in FIG. 8 is a periodic interruption routine which is started at every predetermined time. When the routine shown in FIG. 8 is started, the process of step 600 is performed first.

In step 100, it is determined whether or not the change rate $\Delta P_{M/C}$ (an amount of change in the master cylinder pressure $P_{M/C}$ per unit time) is greater than a first predetermined rate TH$\Delta$P1 and the master cylinder pressure $P_{M/C}$ is greater than a first predetermined amount THP1. The process performed in step 100 is equivalent to the process of the determination for shifting to the first standby state (the process of the necessary condition determination) described with reference to FIG. 5.

The first predetermined amount THP1 and the first predetermined rate TH$\Delta$P1 in the above step 100 is set in accordance with a vehicle velocity SPD and an elapsed time $T_{STOP}$ after the brake switch 14 is turned on. Specifically, the first predetermined amount THP1 is set to a predetermined amount THP1L if the vehicle velocity SPD is greater than or equal to a predetermined velocity $V_0$, and set to a predetermined amount THP1H if the vehicle velocity SPD is smaller than the predetermined velocity $V_0$. The predetermined amounts THP1L and THP1H are set so that a relationship THP1L<THP1H is established. If the first predetermined amount THP1 is set, a condition $P_{M/C} \geq$ THP1 which is one of the conditions for shifting to the first standby state tends to be easily established when the vehicle is moving at a high speed and tends to be difficult to be established when the vehicle is moving at a low speed.

When the vehicle is moving at a low speed, it is less necessary to rapidly increase a brake force as compared to a case in which the vehicle is moving at a high speed. Additionally, when the vehicle is moving at a low speed, a stronger deceleration feel is provided during a low-speed operation in a brake operation as compared to a case in which the vehicle is moving at a high speed. Thus, when the vehicle is moving at a low-speed, it is appropriate that the BA control can be less easily started than a case in which the vehicle is moving at a high speed. If the first predetermined amount THP1 is set to the values as described above, such a requirement can be achieved.

The first predetermined rate TH$\Delta$P1 is set to the predetermined rate TH$\Delta$P1H when the vehicle speed SPD is greater than the predetermined speed $V_0$ and the elapsed time TSTOP after the brake switch 14 is turned on does not reach a predetermined time T0. On the other hand, when the vehicle speed SPD is less than the predetermined speed V0, the first predetermined rate TH$\Delta$P1 is set to the predetermined rate TH$\Delta$P1M. TH$\Delta$P1H and TH$\Delta$P1M are set so that a relationship TH$\Delta$P1H>TH$\Delta$P1M is established.

If the first predetermined rate TH$\Delta$P1 is set as described above, the relationship TH$\Delta$P1 $\leq \Delta P_{M/C}$ which is one of the conditions for shifting to the first standby state tends to be easily established in a high-speed operation, and tends to be difficult to be established in a low-speed operation.

When the driver of a vehicle performs the emergency brake operation while the vehicle is moving at a high speed, the driver operates the brake pedal 12 at a high speed as compared to a case in which the vehicle is moving at a low speed. Thus, it is appropriate to set the threshold value TH$\Delta$P1 for distinguishing that the emergency brake operation is being performed at a relatively small value when the vehicle speed SPD is relatively low and at a relatively large value when the vehicle speed SPD is relatively high.

On the other hand, the first predetermined rate TH$\Delta$P1 is set to a predetermined rate TH$\Delta$P1L when the vehicle speed SPD is greater than the predetermined velocity $V_0$ and the elapsed time $T_{STOP}$ after the brake switch 14 is turned on is greater than a predetermined time $T_0$, that is, the time To has elapsed after start of the brake operation. The predetermined TH$\Delta$P1L is a value smaller than TH$\Delta$P1M.

If the first predetermined rate TH$\Delta$P1 is set as described above, the relationship TH$\Delta$P1 $\leq \Delta P_{M/C}$ which is one of the conditions for shifting to the first standby state tends to be easily established after a relationship $T_{STOP} \geq T_0$ is established as compared to before the relationship is established.

In an automobile, it is possible that an emergency brake operation is started after a certain time has elapsed after start of a brake operation. In this case, the change rate $\Delta P_{W/C}$ generated after start of the emergency operation tends to be difficult to be a high rate since the brake pedal 12 has been already depressed when the emergency brake operation is started.

Accordingly, in order to accurately detect such an emergency brake operation, when a certain time has elapsed after start of the brake operation, it is appropriate to set the first predetermined rate TH$\Delta$P1, which is a threshold value for determining whether or not the emergency brake operation is being performed, to a smaller value than before.

In the above-mentioned step 100, if it is determined that the relationship $\Delta P_{M/C} \geq$ TH$\Delta$P1 or $P_{M/C} \geq$ THP1 is not established, it is determined that the condition for shifting to the first standby state is not established and the routine is ended.

On the other hand, if it is determined that the above-mentioned condition of step 100 is established, then the process of step 102 is performed. In step 102, the ECU starts the operation of the front pump 460 and the rear pump 462. In this way, the operation of the pumps 460, 462 is started at a time when the condition for shifting to the first standby state (that is, the necessary condition) is established in the present embodiment.

The pumps 460, 462, having been started in step 102, attempt to supply the brake fluid stored in the reservoirs 454, 455 to the fluid pressure passage 432, 434, 436. However, each of the pumps 460, 462 cannot immediately start its normal brake operation due to inertia of the internal elements thereof and so it takes a certain time until a predetermined high-pressure brake fluid is supplied to the fluid pressure passage 432, 434, 436, as described above.

In the next step 104, it is determined whether or not the change rate $\Delta P_{M/C}$ is less than the second predetermined rate TH$\Delta$P2.

In step 104, it is determined whether or not the change rate $\Delta P_{M/C}$ is changed from a rate exceeding the second predetermined rate TH$\Delta$P2 to a rate less than the second predetermined rate TH$\Delta$P2 from a previous process cycle to the present process cycle. The second predetermined rate TH$\Delta$P2 is a threshold value for determining whether or not the master cylinder pressure $P_{M/C}$ is rapidly increasing, that is, whether or not the brake pedal 12 is operated at a high speed.

If it is determined, in step 104, that the change rate $\Delta P_{M/C}$ is not changed from a rate exceeding the second predetermined rate TH$\Delta$P2 to a rate less than the second predetermined rate TH$\Delta$P2 during a period from the previous process cycle to the present process cycle, it can be determined that the high-speed operation is not finished during a period from the previous process cycle to the present process cycle. In this case, it is necessary to maintain the first standby state. Thus, the process of step 104 is repeatedly performed until the change rate $\Delta P_{M/C}$ is changed from a rate exceeding the second predetermined rate TH$\Delta$P2 to a rate less than the second predetermined rate TH$\Delta$P2.

On the other hand, if it is determined, in step 104, that the change rate $\Delta P_{M/C}$ is changed from a rate exceeding the second predetermined rate TH$\Delta$P2 to a rate less than the second predetermined rate TH$\Delta$P2 during a period from the previous process cycle to the present process cycle, it can be determined that the high-speed operation is completed during a period from the previous process cycle to the present process cycle. In this case, the process of step 106 is performed.

In step 106, it is determined whether or not a count time of the counter CSTANDBY1, that is, an elapsed time after the condition for shifting to the first standby state is established is greater than a first predetermined time THT1 and less than a second predetermined time THT2. The second predetermined time THT2 is an upper limit value of a time for which the first standby state should be maintained. On the other hand, the first predetermined time THT1 is a value which defines a lower limit of time for which a high-speed operation of the brake pedal 12 lasts during the emergency brake operation.

Accordingly, in the brake force control apparatus of the present embodiment, it can be determined that the current brake operation is not an emergency brake operation if the operating speed of the brake pedal 12 becomes a sufficiently small value before a relationship THT1≦CSTANDBY1 is established after start of the brake operation. That is, if, in the above step 106, it is determined that a relationship THT1≦CSTANDBY1≦THT2 is established, it is not necessary to execute the BA control. In this case, the pumps 460, 462, which were started in step 102, are stopped in step 112 and the routine is ended.

On the other hand, if an affirmative determination is made in step 106, the ECU 10 determines that the emergency brake operation is being performed by the driver (that is, the sufficient condition is established), the ECU 10 shifts to the second standby state. In the next step 108, a process of waiting for passage of a delay time is performed. The delay time is a time taken for the difference Pdiff between the master cylinder pressure $P_{M/C}$ and the wheel cylinder pressure $P_{W/C}$ to become a sufficiently small value after the emergency brake operation is started by the driver. Thus, the wheel cylinder pressure $P_{W/C}$ can be rapidly increased by waiting for passage of the delay time in step 108 rather than by using the pumps 460, 462 as a fluid pressure source. The delay time can be set, for example, based on the vehicle speed SPD and the elapsed time $T_{STOP}$ after the brake switch 14 is turned on.

If, in step 108, it is determined that the delay time has been elapsed, the process proceeds to step 110, in which the BA control is started. When the BA control is started, the start pressure increasing mode is performed as shown in FIG. 5. As described above, the start pressure increasing mode is achieved by turning on the reservoir cut solenoids SRCF 414, SRCR 416 and the master cut solenoids SMFR 426, SMFL 428, SMR 430 as shown in FIG. 2

In the start pressure increasing mode, the brake fluid stored in the reservoir tank 408 is pumped up by the front pump 460 and rear pump 462, and is supplied to the fluid pressure passages 432, 434, 436. As described above, in the brake force control apparatus of the present embodiment, the front pump 460 and the rear pump 462 are started before the BA control is started, that is, at a time when the condition for shifting to the first standby state (the necessary condition) is established in step 100.

Accordingly, even if there is a delay in the start of the pumps 460, 462 due to inertia, the pumps 460, 462 can increase the fluid pressure of the brake fluid to a predetermined value during execution of the process of steps 104 to 108 are executed. Thus, it is possible to supply brake fluid which has been pressurized to a predetermined high pressure to the fluid pressure passage 432, 434, 436 at a time when the BA control is started in step 110 so that the BA control is performed with a high response. When the process of step 110 is completed, the routine is ended.

FIG. 9 shows a flowchart of an example of a variation of the control routine shown in FIG. 8. The routine shown in FIG. 9 is also a periodic interruption routine which is started at predetermined times. Only steps 102A, 110A, and 112A of the control routine according to the present example of the variation are different from the corresponding steps of the control routine shown in FIG. 8. Thus, a description will be given of only steps 102A, 110A, and 112A.

In the control routine shown in FIG. 8, when the condition for shifting to the first standby state is established in step 100, only the pumps 460, 462 are started in step 102. On the contrary, in the example of the variation shown in FIG. 9, when the condition for shifting to the first standby state is established in step 100, the reservoir cut solenoids SRCF 414, SRCR 416 are turned on as well as the pumps 460, 462 in step 102A.

In the embodiment of FIG. 8, the reservoir cut solenoids SRCF 414, SRCR 416 are maintained to be turned off after the operation of the pumps 460, 462 is started in step 102. Accordingly, the brake fluid stored in the reservoir tank 408 is not supplied to the pump 460, 462 so that the pumps 460, 462 attempt to pump up the brake fluid stored in the front reservoir 454 and the rear reservoir 455 to the fluid pressure passages 432, 434, 436.

However, the front reservoir 454 and the rear reservoir 455 are not always filled with the brake fluid. Thus, when the control routine shown in FIG. 8 is performed in a situation in which the amount of the brake fluid stored in the front reservoir 454 and the rear reservoir 455 is small, the brake fluid may not be sufficiently pressurized even if the operation of the pumps 460, 462 is started at a time when the condition for shifting to the first standby state is established.

Therefore, if the BA control is started in step 110 in such a situation, brake fluid which is pressurized to a predetermined high pressure may not be supplied to the fluid pressure passages 432, 434, 436 and the BA control may not be performed with a sufficiently high response.

For this reason, in the present example of the variation, the reservoir cut solenoids SRCF 414, SRCR 416 are turned on simultaneously with the start of the operation of the pumps 460, 462 in step 102A. As a result, it is possible to sufficiently pressurize the brake fluid since the brake fluid stored in the reservoir tank 408 is supplied to the pumps 460, 462 after the process of step 102A is performed.

Thus, it is possible to supply the brake fluid which is pressurized to a predetermined high pressure to the fluid pressure passages 432, 434, 436 when the BA control is started in step 110A so that the response of the BA control can be sufficiently improved. Additionally, in the present example of the variation, since the reservoir cut solenoids SRCF 414, SRCR 416 are turned on in step 102A, a process is not performed to turn on SRCF 414, SRCR 416 in step 110A.

Further, in the present example of the variation, since the reservoir cut solenoids SRCF 414, SRCR 416 are turned on in step 102A, a process is performed to stop the pumps 460, 462 and turn off the reservoir cut solenoids SRCF 414, SRCR 416 in step 112A when it is determined that the BA control is not needed to be executed in step 106.

It should be noted that, in the above-mentioned embodiment, the front pump 460 and the rear pump 462 correspond to the "high pressure source". Additionally, the "necessary condition determining means" can be achieved by the ECU 10 performing the process of step 100; the "sufficient condition determining means" can be achieved by the ECU 10 performing the process of the steps 104 to 108; the "actuating means" can b achieved by the ECU 10 performing the process of step 102 or 102A; and the "supply means" can be achieved by the ECU 10 performing the process of step 110 or 110A.

In the above-mentioned embodiment, a description was given of an example in which the brake force control apparatus according to the present invention is applied to a front-engine rear-drive automobile (FR automobile). However, the brake force control apparatus according to the invention can also be applied to a front-engine front drive automobile (FF automobile), and in general to a pump-up type brake force control apparatus.

Additionally, although the operation of the pumps 460, 462 is started after the condition for shifting to the first standby condition (necessary condition) is established in the present embodiment, the timing for starting the pumps is not limited to this. The timing for starting the pumps may be determined based on other information delivered to the ECU 10, so long as the timing is prior to the start of the BA control. For example, the pumps may be started at a time when a predetermined time has elapsed after the necessary condition is established, at a time when the first sufficient condition is established, or at a time when the speed of the brake operation exceeds a predetermined value. In this case, the brake fluid can be sufficiently pressurized by starting the pumps prior to start of the BA control.

Further, although the emergency brake operation is detected by using a pedal stroke in the present embodiment, a booster stroke, a depression force of the brake pedal, acceleration of the vehicle, or estimated acceleration of the vehicle can be used instead of the pedal stroke.

The present invention is not limited to the embodiments specifically disclosed herein, and various variations and modifications will be made without departing from the scope of the present invention.

What is claimed is:

1. A brake force control apparatus comprising:

emergency brake determining means for determining an emergency brake operation performed by a driver;

a high pressure source for generating a fluid pressure which is higher than a fluid pressure generated by a master cylinder;

supply means for supplying brake fluid from said pump to a wheel cylinder based on the determination made by said emergency brake determining means; and actuating means for actuating said high pressure source before the fluid pressure is supplied by said supply means, characterized in that said emergency brake determining means comprises:

necessary condition determining means for determining an establishment of a necessary condition for the emergency brake operation which is established when a brake operating speed is greater than or equal to a first predetermined speed; and sufficient condition determining means for determining an establishment of a sufficient condition for the emergency brake operation, wherein said actuating means actuates said high pressure source when said necessary condition is established.

2. The brake force control apparatus as claimed in claim 1, characterized in that:

said sufficient condition is established when a high-speed operating time after the brake operating speed becomes greater than or equal to said first predetermined speed until the brake operating speed becomes smaller than or equal to a second predetermined speed is greater than or equal to a first predetermined time.

3. The brake force control apparatus as claimed in claim 2, characterized in that said brake force control apparatus further comprises:

amount of operation detecting means for detecting an amount of brake operation, wherein said high-speed operating time is started to be counted after the brake operating speed exceeds said first predetermined speed and the amount of brake operation exceeds a first amount of operation.

4. The brake force control apparatus as claimed in claim 2, characterized in that:

said supply means supplies the brake fluid from said high pressure source to the wheel cylinder when said high-speed operating time is greater than or equal to said first predetermined time and smaller than or equal to a second predetermined time.

5. The brake force control apparatus as claimed in claim 2, characterized in that:

said second predetermined speed is smaller than said first predetermined speed.

6. A brake force control apparatus comprising:

emergency brake determining means for determining an emergency brake operation performed by a driver;

a high pressure source for generating a fluid pressure which is higher than a fluid pressure generated by a master cylinder;

supply means for supplying brake fluid from said pump to a wheel cylinder based on the determination made by said emergency brake determining means; and actuating means for actuating said high pressure source before the fluid pressure is supplied by said supply means, characterized in that said emergency brake determining means comprises:

necessary condition determining means for determining an establishment of a necessary condition for the emergency brake operation;

first sufficient condition determining means for determining an establishment of a first sufficient condition for the emergency brake operation; and second sufficient condition determining means for determining a necessity for the brake fluid to be supplied by said supply means when a predetermined time has elapsed after said first sufficient means has determined an establishment of said first sufficient condition, wherein said actuating means actuates said high pressure source when said first sufficient condition is established.

7. A brake force control apparatus comprising:

emergency brake determining means for determining an emergency brake operation performed by a driver;

a high pressure source for generating a fluid pressure which is higher than a fluid pressure generated by a master cylinder;

supply means for supplying brake fluid from said pump to a wheel cylinder based on the determination made by said emergency brake determining means; and actuating means for actuating said high pressure source before the fluid pressure is supplied by said supply means, characterized in that said emergency brake determining means comprises:

necessary condition determining means for determining an establishment of a necessary condition for the emergency brake operation;

first sufficient condition determining means for determining an establishment of a first sufficient condition for the emergency brake operation; and second sufficient condition determining means for determining a necessity for the brake fluid to be supplied by said supply means based on a difference between a master cylinder pressure and a wheel cylinder pressure, wherein said actuating means actuates said high pressure source when said first sufficient condition is established.

* * * * *